United States Patent [19]

Masutani

[11] Patent Number: 5,910,835
[45] Date of Patent: Jun. 8, 1999

[54] PHOTOGRAPHIC PROCESSING APPARATUS

[75] Inventor: Hironori Masutani, Wakayama-ken, Japan

[73] Assignee: Noritsu Koki Co., Ltd, Wakayama-ken, Japan

[21] Appl. No.: 08/925,305

[22] Filed: Sep. 8, 1997

[30] Foreign Application Priority Data

Sep. 10, 1996 [JP] Japan ................................ 8-238821
Aug. 28, 1997 [JP] Japan ................................ 9-232324

[51] Int. Cl.$^6$ ............................. G03B 27/32; G03B 27/52
[52] U.S. Cl. ............................. 355/27; 355/40; 355/41; 396/311
[58] Field of Search ................................ 355/27, 28, 40, 355/41; 396/567, 578, 311

[56] References Cited

U.S. PATENT DOCUMENTS

| 3,751,874 | 8/1973 | Schultes et al. ..................... 53/59 R |
| 5,097,292 | 3/1992 | Hicks .................................. 355/75 |
| 5,159,385 | 10/1992 | Imamura ............................. 355/40 |
| 5,319,401 | 6/1994 | Hicks .................................. 355/40 |
| 5,737,062 | 4/1998 | Yoshikawa ......................... 355/40 |
| 5,745,217 | 4/1998 | Factor ................................. 355/40 |
| 5,745,219 | 4/1998 | DeMarti et al. ................... 355/40 |

FOREIGN PATENT DOCUMENTS

| 255480A1 | 2/1988 | European Pat. Off. ....... G06K 17/00 |
| 2183357 | 11/1990 | Japan ............................. G03B 27/32 |
| 643622 | 2/1994 | Japan ............................. G03D 15/00 |
| 6283638 | 11/1994 | Japan ............................. G03D 15/00 |
| 6292647 | 11/1994 | Japan ............................. G03D 15/00 |
| 7219201 | 8/1995 | Japan . |

Primary Examiner—Alan A. Mathews
Attorney, Agent, or Firm—Fulbritht & Jaworski, LLP.

[57] ABSTRACT

A photographic processing apparatus having an exposing section (20) for printing images of negative films (2) received from a negative film feeder (10) on printing paper (3), a negative film outlet (60) for discharging the negative films used in the exposing section, and a developing section (30) for developing the printing paper printed. This apparatus includes a negative film ID allocating device (5f) for generating a negative film ID code and allocating the negative film ID code to the negative films to be subjected to a printing process, and a link manager (5k) for managing a linked relationship between the negative film ID code and information relating to the negative films.

9 Claims, 18 Drawing Sheets

C.U.=CONTROL UNIT
A.U.=ALLOCATING UNIT
D.U.= DETERMINING UNIT
B.C.=BAR-CODE

PHOTOGRAPHIC PROCESSING APPARATUS

BACKGROUND OF THE INVENTION

1. Field of the Invention

This invention relates to a technique of managing stages of processing negative films and a photosensitive material such as printing paper in a photographic processing apparatus having an exposing section for printing images of negative films received from a negative film feeder on printing paper, a negative film outlet for discharging the negative films used in the exposing section, and a developing section for developing the printing paper printed.

2. Description of the Related Art

In the photographic processing apparatus noted above, a combination of negative films and prints processed as one unit usually is based on a single length of negative film or one set of piece negatives (cut negative films each having four or six frames) ordered by a customer. This one unit is called one order also. When the same customer orders printing of several negative films or several sets of piece negatives at the same time, they are processed as separate orders. A photographic processing apparatus for collating piece negatives (one long negative film ultimately being cut to piece negatives of a predetermined length) and prints in one order or unit and automatically putting the negatives and prints in a product packet is known from Japanese Patent Publication Kokai No. H6-43622, for example. This photographic processing apparatus includes a stage of collating piece negatives and prints, in which the piece negatives in one unit inserted into negative sheets after an exposing process are put into a print packet printed with an ID of these piece negatives. The ID on the print packet is compared with IDs of prints transported unit by unit by a sorter. The prints in one unit having the same ID are put into this print packet to be combined with the piece negatives having this ID. Further, Patent Publication Kokai No. H7-219201 discloses that a film ID originally given to a photographic film at the manufacturing stage is read in time of development and printing, and the ID is printed on printing paper after images are printed thereon, and on a product packet for receiving the film. This facilitates a collation of photographic film and printing paper (or prints).

A management system using a common ID as noted above contributes to some degree to simplification of the collating operation at the final stage of photographic processing. However, a film ID originally given to a photographic film is not obtained until it is read by some reading device provided for a photographic processing apparatus. It is therefore inconvenient to use it as a key code for management of photographic processing in the photographic processing apparatus. There is hardly any chance of film IDs of negative films continuously fed into the photographic processing apparatus being consecutive codes. Even if the film IDs are in the form of visually recognizable codes, there are just random rows of codes very difficult to recognize.

Further, to realize a real-time management of entire processing of negative films and prints, it is necessary to associate negative films and prints with each other which have encountered varied events, particularly troubles, in the course of photographic processing. Such association is impossible with the conventional ID management system noted above.

SUMMARY OF THE INVENTION

The object of this invention is to provide a photographic processing apparatus which overcomes the disadvantages noted above, and which enables a high-level management of negative films and a photographic material such as printing paper during photographic processing.

The above object is fulfilled, according to this invention, by a photographic processing apparatus having an exposing section for printing images of negative films received from a negative film feeder on printing paper, a negative film outlet for discharging the negative films used in the exposing section, and a developing section for developing the printing paper printed, the apparatus comprising negative film ID allocating means for generating a negative film ID code and allocating the negative film ID code to the negative films to be subjected to a printing process, and a link manager for managing a linked relationship between the negative film ID code and information relating to the negative films.

In the above construction, selected negative film ID codes, e.g. consecutive codes, are allocated to negative films to be processed, as key codes for use exclusively in photographic processing. A high-level management is achieved by linking necessary information to each negative film ID code.

In a preferred embodiment of this invention, the link manager is operable to manage a linked relationship between the negative film ID code and a film ID intrinsic to the negative films. The intrinsic film ID is a film ID (FID) printed or magnetically recorded on a cartridge or other photographic film container or on photographic films per se. In most cases, the film ID is recorded in time of manufacture. By linking such film ID and negative film ID code, the negative film code and event information linked thereto may be retrieved, as necessary, by using the film ID read directly from the photographic film as a key, or the film ID may be retrieved by using the negative film ID as a key. The feature is advantageous particularly where films are taken out of the container for photographic processing, and put back into the container after the processing.

In a further preferred embodiment of this invention, the link manager is operable to manage a linked relationship between the negative film ID code and an event occurring with the negative films during photographic processing. A trouble occurring, during photographic processing, with the negative film to which the negative film ID has been allocated, or printing particulars recognized, may be linked to the negative film ID of the negative film. Thus, conditions of the negative film being processed are recorded reliably, to enable confirmation at any time, thereby realizing a thorough-going negative film management.

In order to associate a trouble occurring during photographic processing with the negative film and printing paper relating to the trouble, it is proposed to provide trouble detecting means for detecting a trouble occurring with the negative films during the photographic processing, wherein the link manager is operable to link trouble information recognized by the trouble detecting means to the negative film ID code and/or print ID code as an event.

To assist in an operation to insert negative films and prints into a product packet issued in time of a photographic processing order, the link manager may be operable to manage a linked relationship between the negative film ID code and a packet ID code applied to a product packet in which the negative films have been stored.

To realize a thorough-going management of printing paper or prints, the above photographic processing apparatus may further comprise print ID code allocating means for allocating a print ID code to printing paper having frame images of the negative films printed thereon in the exposing section, wherein the link manager is operable to manage a linked relationship between the print ID code and an event occurring with the printing paper during photographic processing.

To manage both the negative films and printing paper, the above photographic processing apparatus may include both the negative film ID allocating means and print ID code allocating means. Then, the link manager may manage a linked relationship between the negative film ID and print ID code and an event occurring with the negative films and prints during the photographic processing.

In a preferred embodiment of this invention, a tray conveyer is provided for receiving negative films in one unit discharged from the negative film outlet, receiving prints having images obtained from the negative films in the one unit and cut to predetermined lengths from the developed printing paper, and combining and transporting the negative films and the prints as finished products. A tray ID code is allocated to each tray of the tray conveyer. The link manager is operable to manage a linked relationship among the tray ID code, the negative film ID code and the print ID code in order to identify the negative films and prints loaded into a predetermined one of trays. With this proposed embodiment, checking may be made automatically whether negative films and prints to be combined are to be loaded or have been loaded into a predetermined tray.

Thus, it is an important aspect of this invention to realize an ID code management for enabling confirmation of various information on particular negative films and prints at any time. This is achieved by recording various information relating to negative films and prints in a retrievable form throughout the processing in the photographic processing apparatus starting with loading of the negative films and printing paper.

Other features and the advantages of this invention will be apparent from the following description of the embodiments to be taken with reference to the drawing.

DESCRIPTION OF THE PREFERRED EMBODIMENTS

Figure 1:
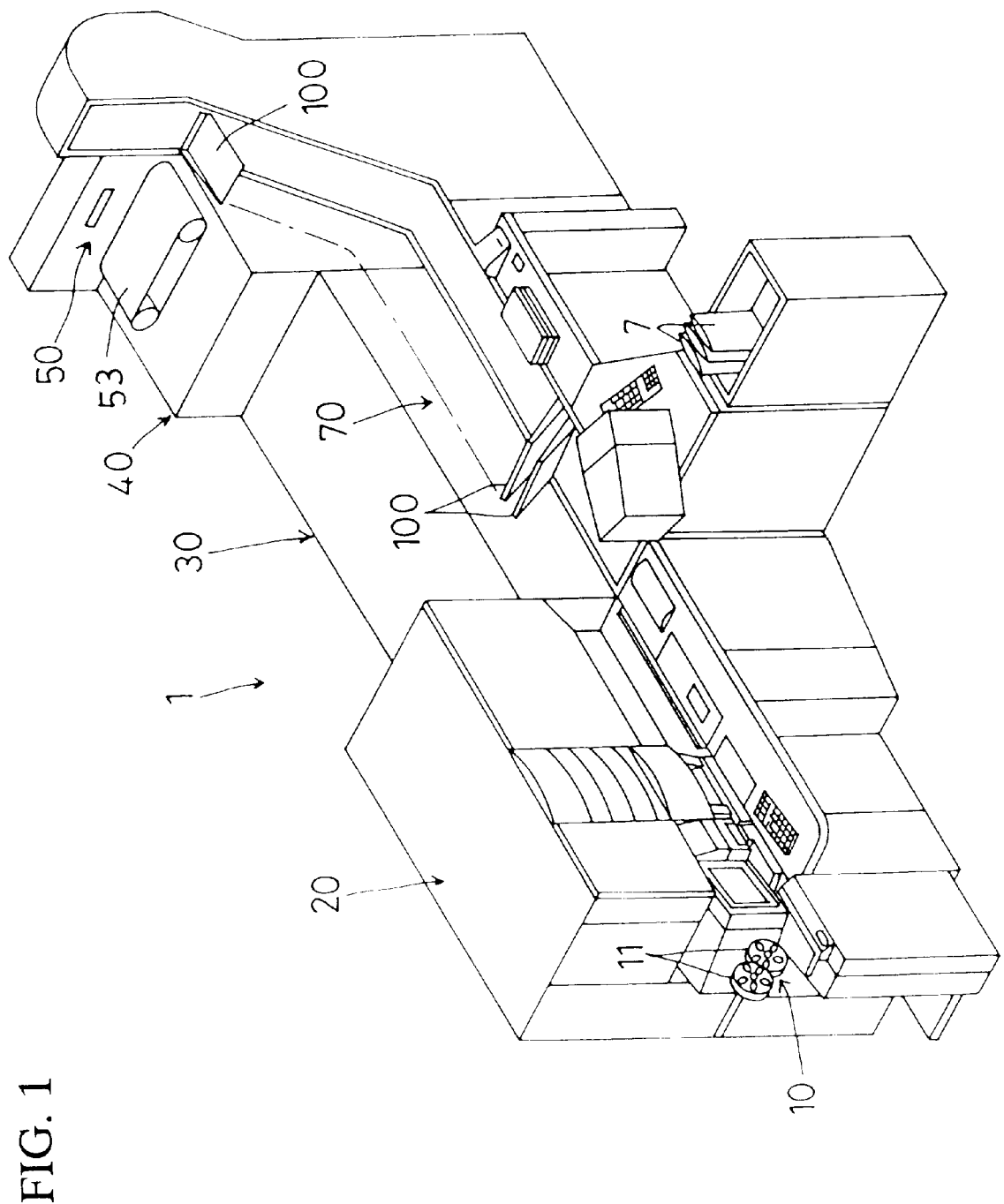
FIG. 1 is a perspective view of a photographic processing apparatus employing a photograph collating system according to this invention.
Figure 2:
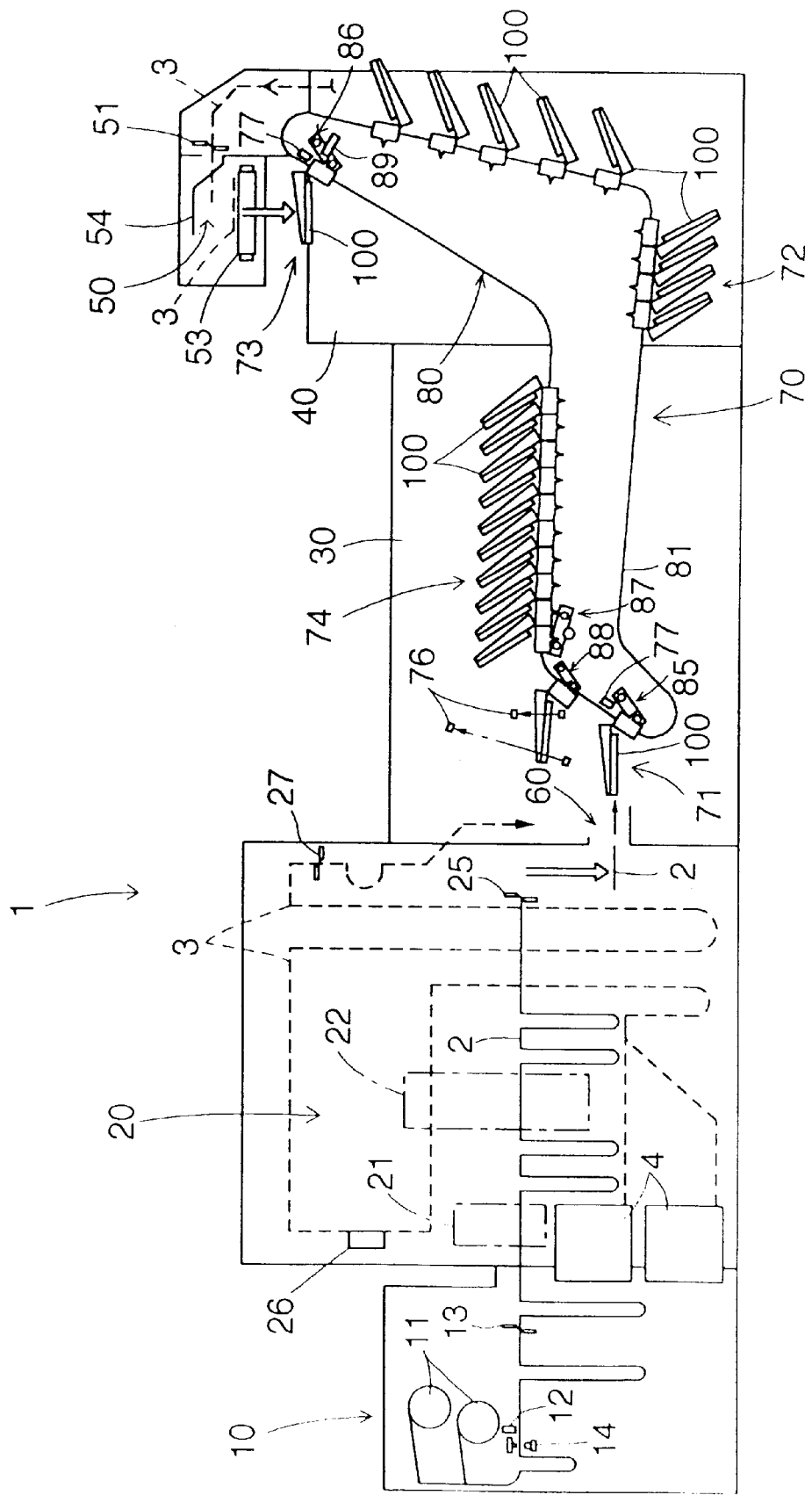
FIG. 2 is a schematic view of the photographic processing apparatus showing flows of negative films and printing paper in the apparatus of FIG. 1.

FIG. 1 shows an entire photographic processing apparatus 1 according to this invention. FIG. 2 schematically shows transport paths of a negative film 2 (the term negative film being used herein to refer collectively to a negative film having a length of one photographic film, cut piece negatives each having several frames, and a negative film in a cartridge designed for an advanced photo system) and printing paper 3 undergoing varied processes in the photographic processing apparatus 1. This photographic processing apparatus 1 includes a negative film feeder 10, an exposing section 20 for printing images of the negative film 2 on the printing paper 3 drawn from a paper magazine 4, a developing section 30 for developing the exposed printing paper 3, a drying section 40 for drying the developed printing paper 3, a print outlet 50 for cutting and discharging the dried printing paper 3 in predetermined lengths as prints, a negative film outlet 60 for cutting and discharging the negative film 2 used in the exposing section 20, with negative sheets inserted as necessary, and a conveyer mechanism 70 for collating and combining, as a finished product, the cut negative films 2 in one unit (which may be regarded as one order to facilitate understanding) received from the negative film outlet 60 and the prints in the one unit received from the print outlet 50, and transporting the finished product to a position for collection by the operator.

The negative film feeder 10 may be loaded with two negative reels 11 each having up to 100 negative films 2 connected by splicing tape. A bar-code reader 12 reads bar codes on the negative films 2 drawn from either negative reel 11. A negative cutter 13 cuts the negative films 2 order by order.

Figure 3:
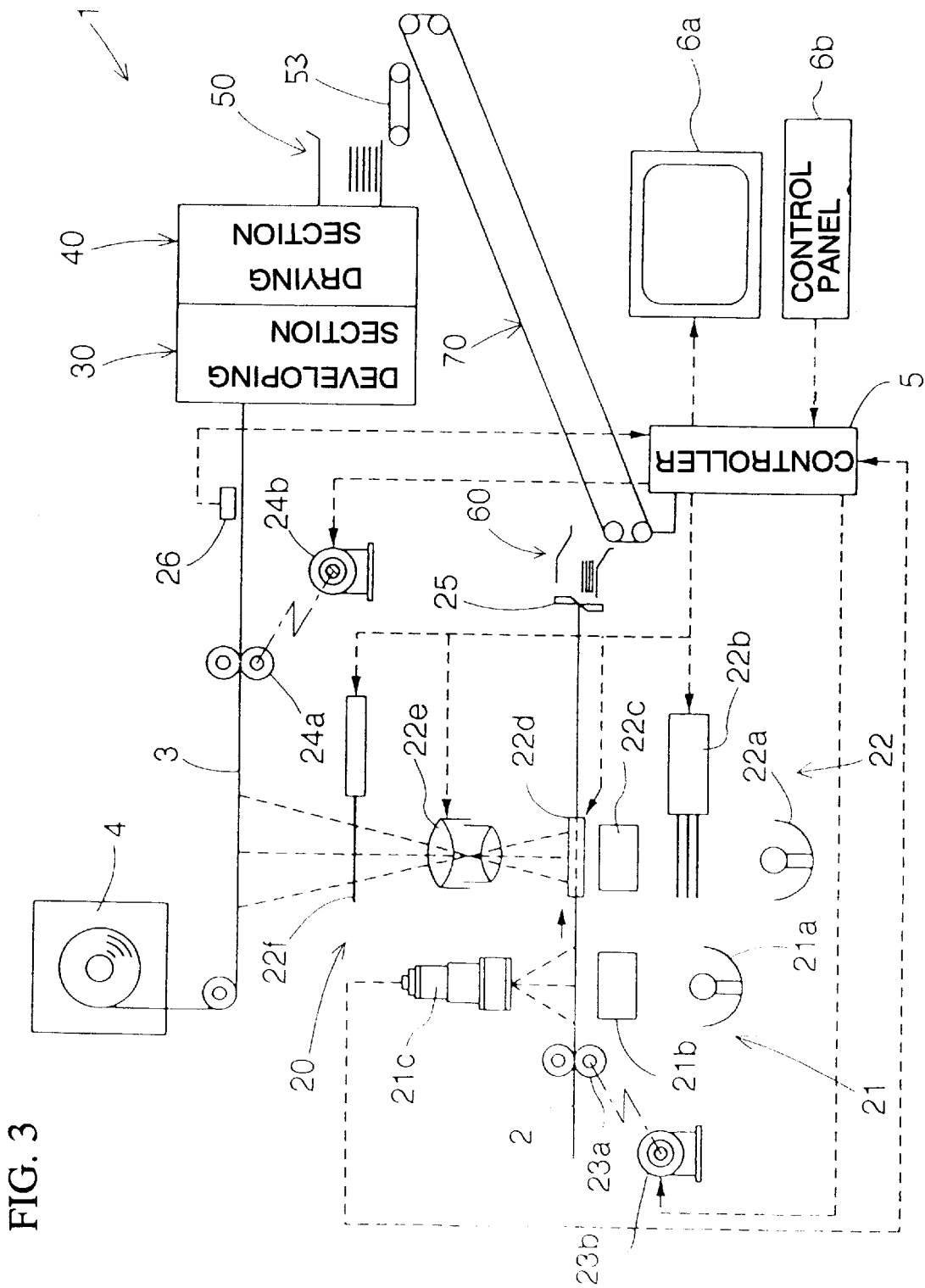
FIG. 3 is a block diagram of the photographic processing apparatus shown in FIG. 1.

As shown in FIG. 3 (in which the vertical arrangement of negative film 2 and printing paper 3 is inverted from FIG. 2), the exposing section 20 includes a film reader 21 disposed upstream with respect to a direction of film transport and having a reading light source 21a, a mirror tunnel 21b and an image pickup 21c, and an exposing device 22 disposed downstream with respect to the film transport direction and having an exposing light source 22a, a light adjustment filter 22b, a mirror tunnel 22c, a negative mask 22d, a printing lens 22e and a shutter 22f. Rollers 23a and a motor 23b for driving the rollers 23a are provided to transport the negative film 2 from the negative film feeder 10 through the exposing section 20 to the negative outlet 60.

Figure 4:
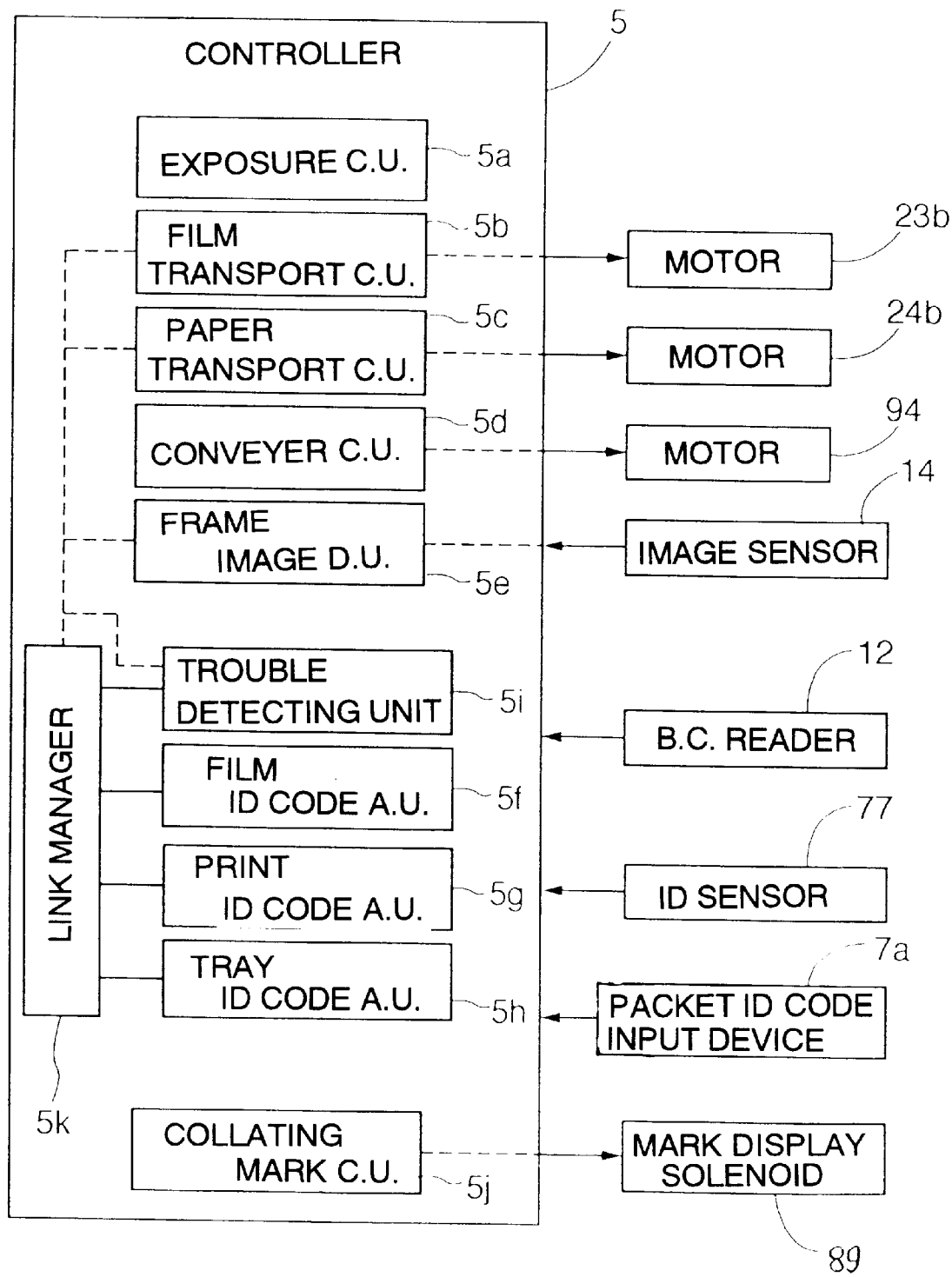
FIG. 4 is a block diagram of a controller.

First, the film reader 21 reads the image of each frame on the negative film 2 transported by the rollers 23a, and transmits image information to a controller 5 which is illustrated in detail in the block diagram of FIG. 4. From the image information received from the film reader 21, an exposure control unit 5a of the controller 5 derives exposing conditions for printing the images of the negative film 2 on the printing paper 3. The exposure control unit 5a controls the light adjustment filter 22b and shutter 22f based on the exposing conditions derived to expose the printing paper 3 when the corresponding frame on the negative film 2 arrives at the position of negative mask 22d. In addition, the controller 5 processes the image information of the negative film 2 read by the film reader 21, and causes a monitor 6a to display simulations of images to be printed on the printing paper 3 with the exposing conditions derived. The operator may observe the simulated images displayed on the monitor 6a, and correct the exposing conditions through a control panel 6b as necessary.

The negative film 2 emerging from the exposing section 20 is cut to a plurality of negative pieces 2 each having six or four frames by a negative cutter 25 in the negative outlet 60 disposed downstream of the exposing device 22 with respect to the film transport direction. The negative pieces 2 are delivered to the conveyer mechanism 70. Depending on specifications, the negative pieces 2 may be inserted into negative sheets by a negative inserter not shown, the negative sheets being folded before delivery to the conveyer mechanism 70. The negative film 2 designed for an advanced photo system is drawn out of the cartridge before the varied processes, and rewound into the cartridge again after the processes. This type of negative film 2 after the exposing process is delivered to the conveyer mechanism 70 as contained in the cartridge. The negative film 2 is drawn from the negative reel 11 and ultimately transported to the conveyer mechanism 70 under control of a negative film transport control unit 5b of the controller 5.

The developing section 30 includes a plurality of developing tanks not shown. The printing paper 3, with the images of the negative film 2 printed thereon in the exposing section 20, is transported by rollers 24a and a motor 24b for driving the rollers 24a, through a correction print unit 26, and successively through the developing tanks in the developing section 30 to be developed. A cutter 27 is disposed upstream of the developing section 30 for cutting the printing paper 3 in an emergency, e.g. when the printing paper 3 cannot be fed from the exposing section 20 to the developing section 30 despite the presence of a loop.

The developed printing paper 3 is dried in the drying section 40 and forwarded to the print outlet 50, where the paper 3 is cut by a paper cutter 51 to become finished prints 3. The prints 3 are delivered by a transverse conveyer 53 to the conveyer mechanism 70. Numeral 54 denotes a printing paper bypass for discharging the printing paper 3 without being cut when the printing paper 3 cannot be delivered to the conveyer mechanism 70 owing to some trouble. The series of operations for transporting the printing paper 3 or prints 3 and shunting the paper to the bypass 54 is controlled by a paper transport control unit 5c of the controller 5.

Figure 5:
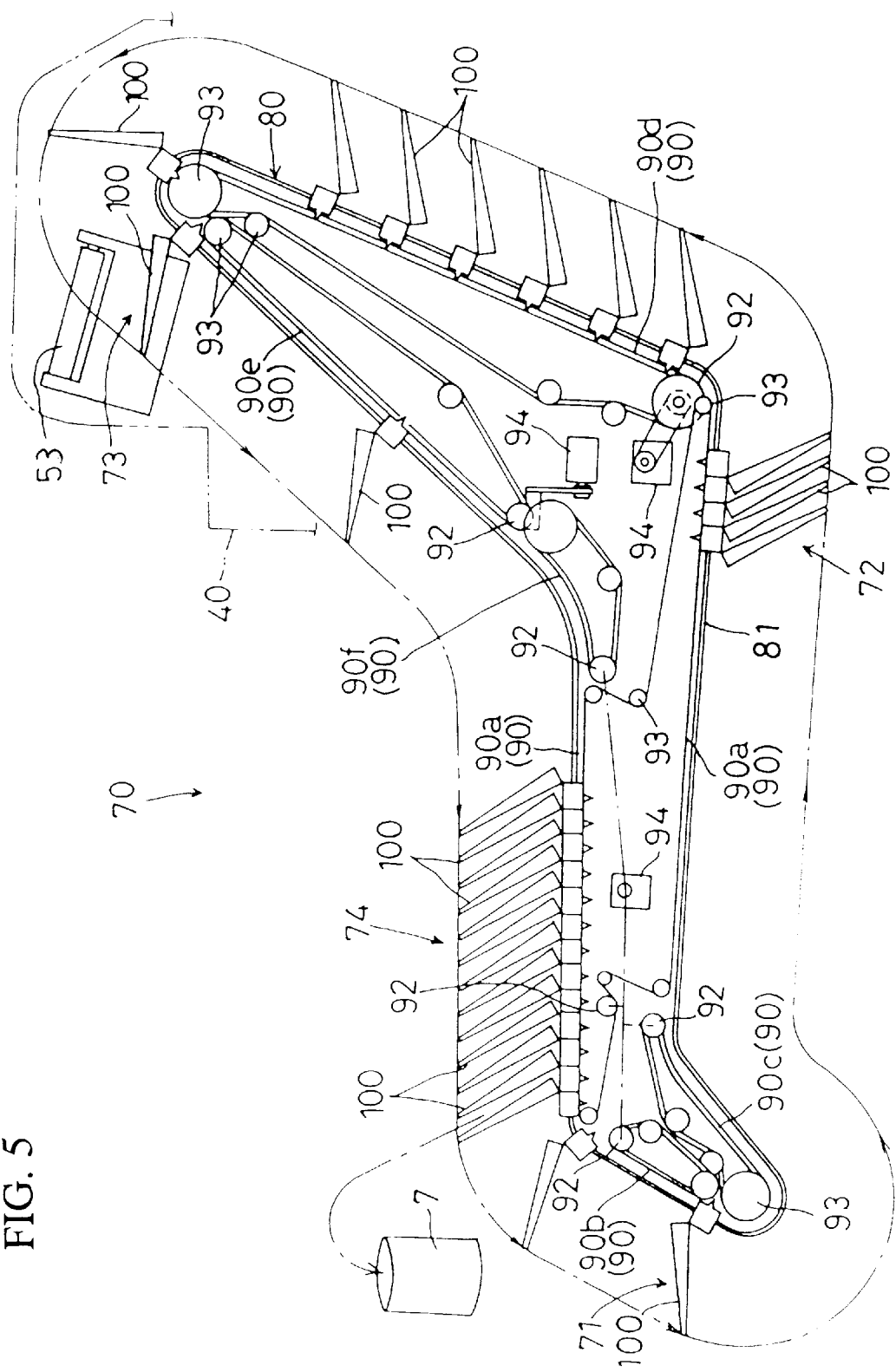
FIG. 5 is a schematic view of a conveyer mechanism forming part of the photograph collating system.
Figure 6:
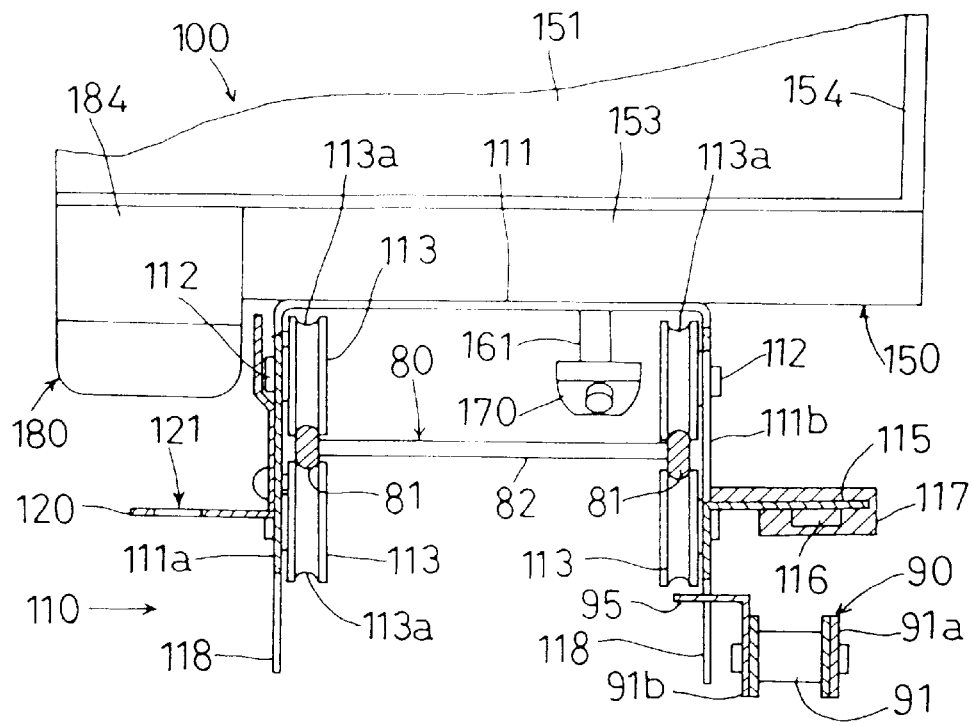
FIG. 6 is an explanatory view showing a relationship between a drive unit and a running device of a tray.

As shown in FIG. 5, the conveyer mechanism 70 is the tray conveyer type including a plurality of trays 100 driven by a drive device 90 to move along a guide circuit 80. A transport line provided by the guide circuit 80 includes a negative film intake station 71, a standby station 72, a print intake station 73 and a collating station 74. As shown in FIG. 6, the guide circuit 80 is formed of a pair of right and left rails 81 having an approximately circular section and a connector 82 interconnecting the rails 81 with a predetermined spacing therebetween. The guide circuit 80 extends along side walls of the developing section 30 and drying section 40 and between the negative film outlet 60 disposed in a lower position of the photographic processing apparatus 1 and the print outlet 50 disposed in an upper position thereof.

Figure 7:
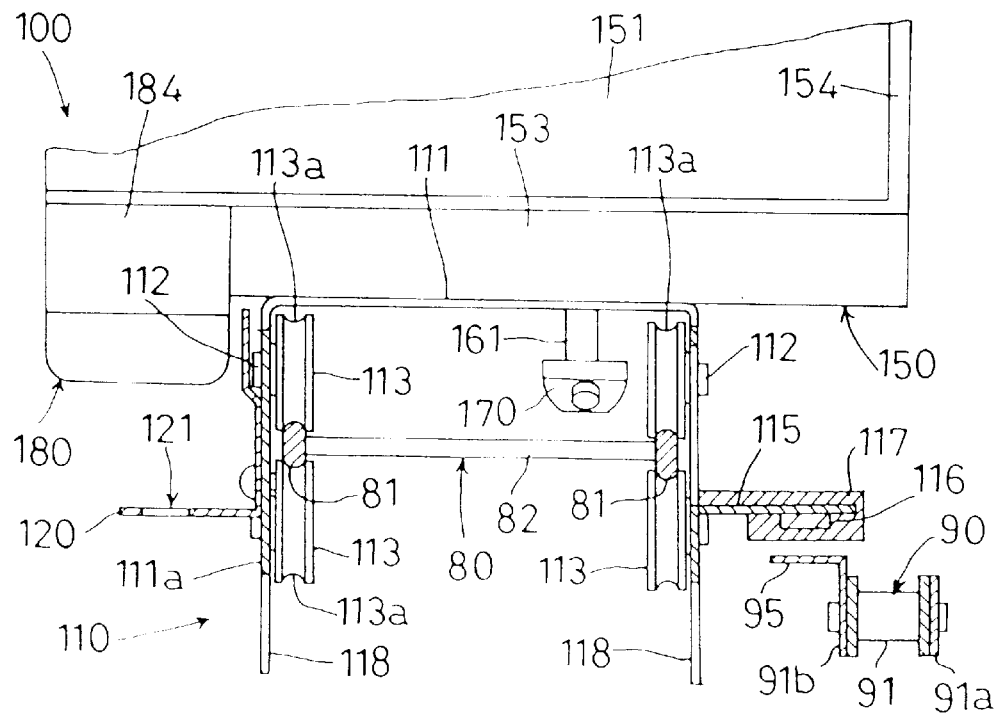
FIG. 7 is an explanatory view showing a relationship between another drive unit and the running device of the tray.
Figure 8:
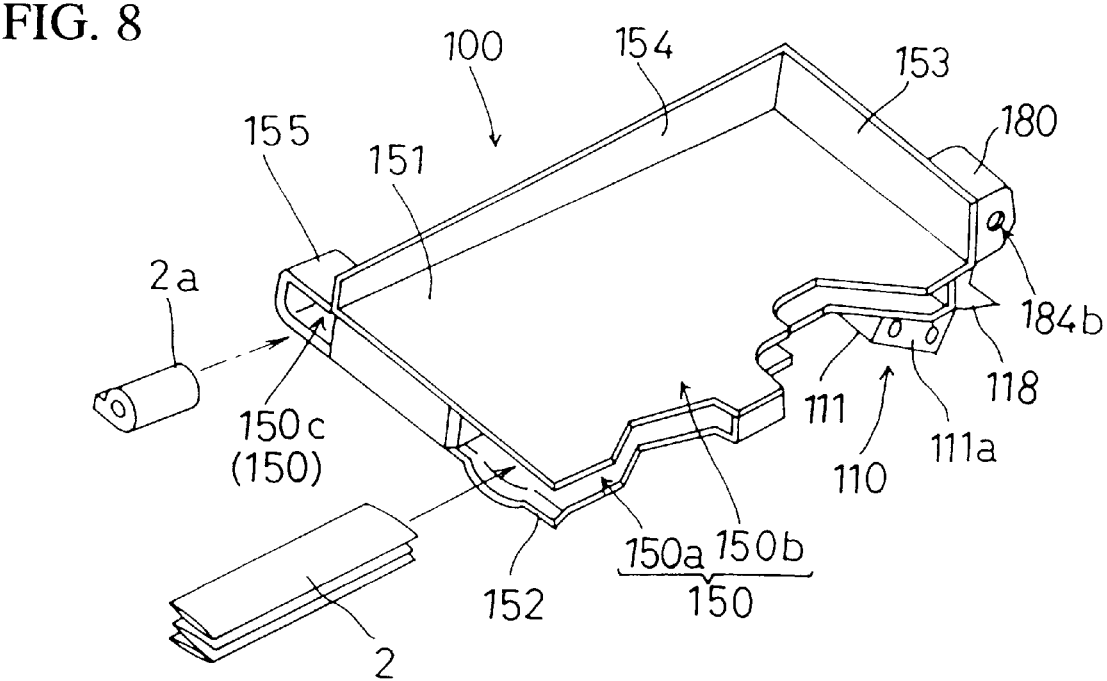
FIG. 8 is an explanatory view showing loading of negative films into a film holder.

As shown in FIGS. 6 through 8, each tray 100 includes a running device 110 for running on the rails 81, and a carrier 150 having a film holder 150a and a print holder 150b. The running device 110 has a channel-shaped running base 111, four running rollers 113 rotatably supported through axles 112 inside each of opposite side ribs 111a and 111b of the running base 111, and an angle bracket 114 (FIG. 9) for attaching the carrier 150 to the running base 111 at an angle thereto. The eight running rollers 113 of each tray 100 have running surfaces defining grooves 113a shaped to fit on the rails 81. The running device 110 runs steadily on the rails 81, with upper and lower front running rollers 113 and upper and lower rear running rollers 113 on the right rib 111a gripping the right rail 81 in two positions thereof, and upper and lower front running rollers 113 and upper and lower rear running rollers 113 on the left rib 111a gripping the left rail 81 in two positions thereof.

At the negative film intake station 71, negative films 2 in one unit discharged from the negative film outlet 60 are transferred to the film holders 150a of trays 100. At the standby station 72, the trays 100 loaded with the negative films 2 can stand by to ensure timing to discharge from the print outlet 50 of prints 3 in the one unit having the images of negative films 2 loaded into the trays 100. At the print intake station 73, the prints 3 in the one unit on which the images of negative films 2 stored in the film holders 150a are printed are transferred from the print outlet 50 to the print holders 150b of trays 100. At the collating station 74, the negative films 2 and prints 3 in the one unit carried by the trays 100 are collated, collected from the trays and put into a product packet. Such collation and collection from each tray 100 are not synchronized with delivery of the trays 100 to the collating station 74. Thus, at the collating station 74, as at the standby station 72, the trays 100 may be stored on the rails 81. Emptied trays 100 are forward to the negative film intake station 71 again.

The trays 100 are transported by a drive device 90 of the chain drive type employing chains 91 as endless drive elements. As seen from FIG. 5, the drive device 90 is divided into a first to a sixth drive units 90a–90f. The first drive unit 90a extends between the collating station 74 and standby station 72. The second drive unit 90b is arranged to move emptied trays 100 to a tray stopping position in the negative intake station 72. The third drive unit 90c is arranged to move the trays 100 loaded with the negative films 2 to a storage line at the standby station 72 defined partly by the first drive unit 90a. The fourth drive unit 90d is arranged to move the trays 100 stored in the standby station 72 successively to a tray stopping position in the print intake station 73. As seen from FIG. 5, the fourth drive unit 90d moves the trays 100 up a steep slope. The fifth drive unit 90e moves the trays 100 additionally loaded with prints 3 down a steep slope to a portion of the first drive unit 90a forming the collating station 74. Since the guide circuit 80 is curved upstream of the collating station 74, the sixth drive unit 90f is disposed between the fifth drive unit 90e and the first drive unit 90a to move the trays 100 along the curved line. Each of the above drive units includes a chain 91, a drive sprocket 92 and direction changing sprockets 93 engaging the chain 91, and a drive motor 94 for driving the drive sprocket 92. The first, second, third and sixth drive units 90a, 90b, 90c and 90f receive power from a common drive motor 94. The fourth and fifth drive units 90d and 90e must operate intermittently in a timed way, and therefore receive power from individual drive motors 94, respectively. Each chain 91 includes not only ordinary link plate 91a but pulling link plates 91b defining hitches 95 arranged at predetermined intervals and extending axially of the rollers. Each chain 91 moves the trays 100 by means of these hitches 95.

Two types of engagement are employed for drive transmission between the hitches 95 and the running devices 110 of the trays 100. That is, to form the storage lines, the first drive unit 90a produces an engagement as shown in FIG. 7. A magnet 116 is fixed by a resin 117 to a lower surface of a mounting plate 115 extending perpendicular to and outwardly of the rib 111b of each running device 110. A magnetism acts between the magnet 116 and each hitch 95 of the chain 91 to form an engagement between the running device 110 of each tray 100 and each hitch 95 of the chain 91, whereby the chain 91 moves the tray 100. For this purpose, at least the pulling link plates 91b are formed of a magnetic substance. Thus, when the tray 100 is stopped running by a force greater than the magnetism acting between the tray 100 and chain 91, the engagement between the magnet 116 and hitch 95 is broken whereby only the chain 91 moves forward, leaving the tray 100 standing still. In this way, the trays 100 are successively stored with end surfaces of the running bases 111 contacting each other. After a preceding tray moves forward, the magnet 116 of a next tray 100 magnetically engages a hitch 95 of chain 91 again. Thus, the next tray 100 begins to be moved by the chain 91. That is, the trays 100 are stored and advanced to the position for taking out the negative films 2 and prints 3 automatically and without delay.

The drive units other than the first drive unit 90a have only to move trays 100 and chains 91 together. As shown in FIG. 6, lugs 118 extend downward from lower ends of the ribs 111a and 111b of each running base 110 to contact the hitches 95 of chain 91. As a result, an engagement is produced to transmit drive between the running device 110 and hitches 95. The drive motors 94 are controlled by a conveyer control unit 5d of the controller 5 in a coordinated way.

At the negative film intake station 71, the trays 100 are stopped by a first stopper 85 between the second drive unit 90b the third drive unit 90c to receive negative films 2 from the negative outlet 60. Further, at the print intake station 73, the trays 100 are stopped by a second stopper 86 between the fourth drive unit 90d and fifth drive unit 90e to receive prints 3 from the print outlet 50. The first stopper 85 and second stopper 86 have the same construction. The construction of the first stopper shown in FIG. 9 will be described here.

Figure 9:
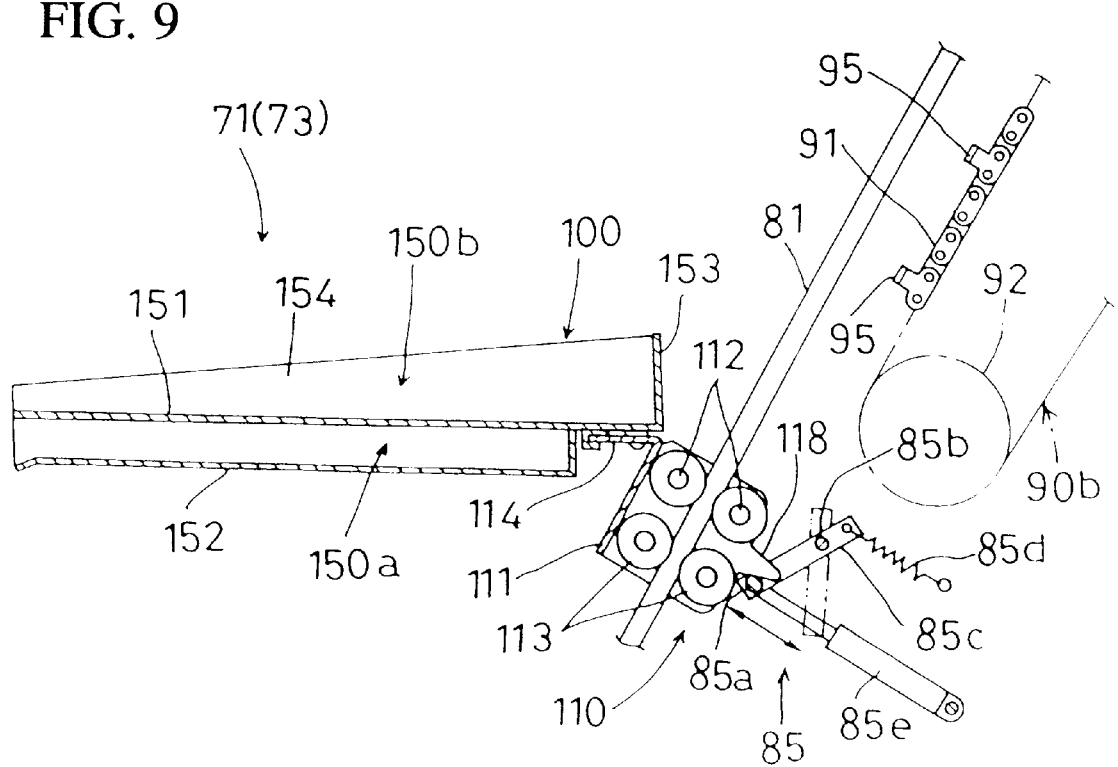
FIG. 9 is a schematic view of a first stopper.

The first stopper 85 includes a swing arm 85c pivotable about an axis 85b, an engaging pin 85a disposed at one end of the swing arm 85c for engaging, upon swing of the swing arm 85c, one of the lugs 118 on the running base 111 of each tray 100, a spring 85d engaged with the other end of the swing arm 85c to bias the swing arm 85c clockwise about the axis 85b in FIG. 9, and a linear acting solenoid 85e connected to the swing arm 85c adjacent the engaging pin 85a. When energized, the linear solenoid 85e swings the swing arm 85c counterclockwise about the axis 85b in FIG. 9. When the linear solenoid 85e is de-energized, the engaging pin 85a enters a moving track of the lugs 118 of trays 100. Thus, the first stopper 85 stops the tray 100 released from the hitch 95 of the second drive unit 90b and sliding down the sloping rails 81. When the linear solenoid 85e is energized, the engaging pin 85a is retracted from the moving track of the lugs 118 of trays 100 to permit passage of the trays 100. The positional relationship between the second stopper 86 and the fourth drive unit 90d, and downward sloping of the rails 81, are similar to the case of the first stopper 85. The second stopper 86 can similarly control stopping and passage of the trays 100.

Figure 10:
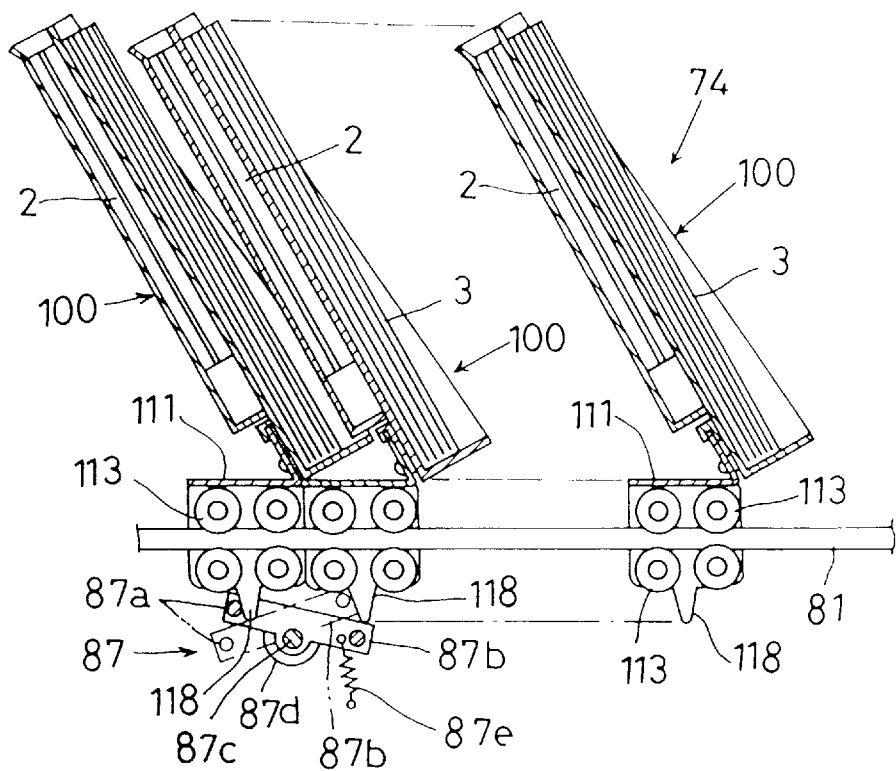
FIG. 10 is a schematic view of a third stopper.

The collating station 74 has a third stopper 87 for stopping a leading end of trays 100 stored. As shown in FIG. 10, the third stopper 87 includes a swing arm 87b which makes seesaw movement about a rotary shaft 87c, a pair of engaging pins 87a disposed at opposite ends of the swing arm 87b for selectively engaging the lugs 118 of trays 100 upon swing of the swing arm 87b, a rotary solenoid 87d connected to the rotary shaft 87c to swing the swing arm 87b, and a spring 87e engaged with one end of the swing arm 87b to bias the swing arm 87b clockwise in FIG. 10. With the third stopper 87 having the above construction, when the rotary solenoid 87d is de-energized, the spring 87e places the swing arm 87b in a position shown in solid lines in FIG. 10, to stop the leading tray 100. The other trays 100 following the leading tray 100 are moved along the rails 81 by magnetism until each contacts a preceding tray 100. Upon contact with the preceding tray 100, the movement by magnetism becomes impossible, and thus the trays 100 are successively stored close to one another. When the rotary solenoid 87d is energized, the swing arm 87b is moved against the biasing force of spring 87e to a position shown in two-dot-and-dash lines in FIG. 10, to stop the next tray 100. The first drive unit 90a, by magnetism, starts moving the leading tray 100 now freed. When, in this state, the rotary solenoid 87d is de-energized, the swing arm 87b returns to the position shown in the solid lines in FIG. 10, to stop the new leading tray 100 having been moved slightly by the first drive unit 90a. The tray 100 released from the first drive unit 90a moves toward the second drive unit 90b with the aid of the downward slope, and is stopped by a fourth stopper 88 disposed between the first drive unit 90a and second drive unit 90b.

Figure 11:
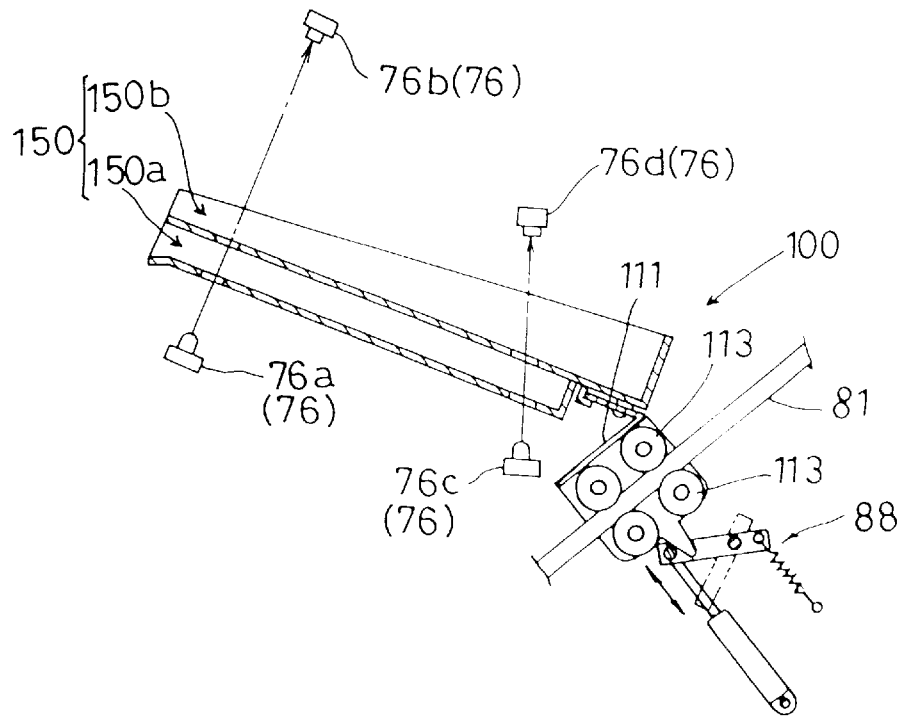
FIG. 11 is a schematic view of an optical sensor.

The fourth stopper 88 is operable to time forwarding of each tray 100 to the negative film intake station 71. The fourth stopper 88 is controlled to advance a new tray 100 simultaneously with departure of a preceding tray 100 from the negative film intake station 71. That is, the third stopper 87 and fourth stopper 88 advance one stored tray 100 after another to the negative film intake station 71, while at the same time the trays 100 are successively advanced along the storage line of the collating station 74. As shown in FIG. 11, the fourth stopper 88 has substantially the same construction as the first stopper 85 and second stopper 86, and will not be described further.

As shown in FIG. 11, an optical sensor 76 is provided in a position where each tray 100 is stopped by the fourth stopper 88, for detecting negative films 2 and prints 3 stored in the film holder 150a and print holder 150b of tray 100, respectively. The optical sensor 76 includes an LED 76a and a light receiving element 76b for detecting negative films 2, and an LED 76c and a light receiving element 76d for detecting prints 3. The carrier 150 defines bores (not shown) for allowing passage of light emitted from the LED 76a and LED 76c. Detection signals of the optical sensor 76 are inputted to the controller 5 which determines whether the tray 100 stopped by the fourth stopper 88 is empty or not. The operations of the first stopper 85, second stopper 86, third stopper 87 and fourth stopper 88 are controlled by the controller 5.

Figure 12:
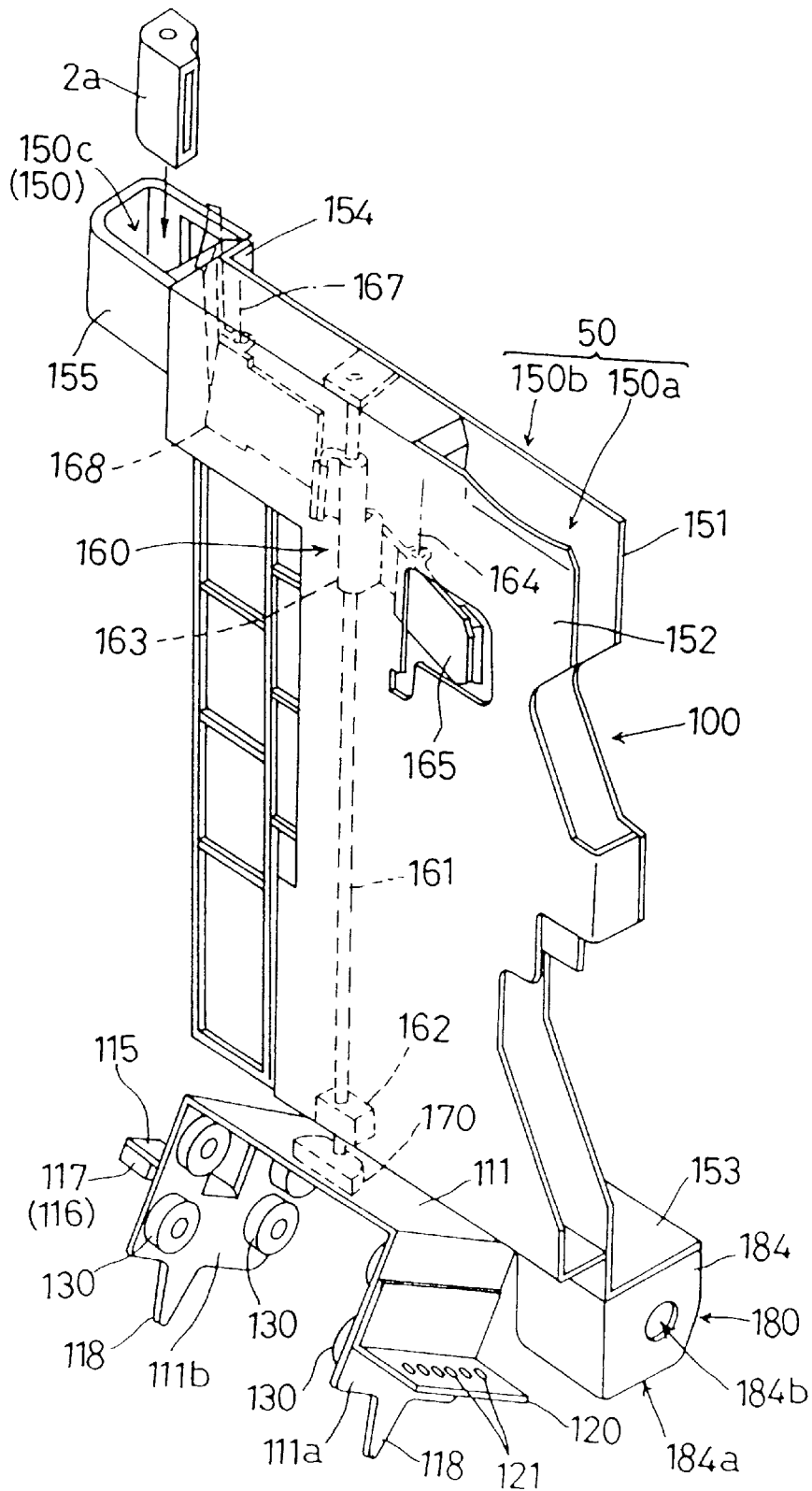
FIG. 12 is a perspective view of a tray.
Figure 13:
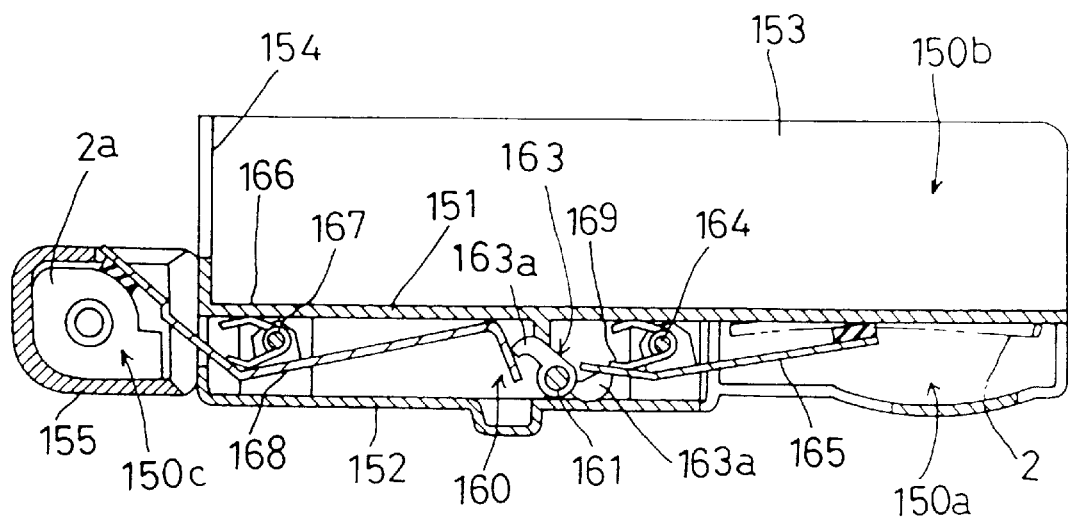
FIG. 13 is a sectional view of a pressing/retaining mechanism of a tray.
Figure 14:
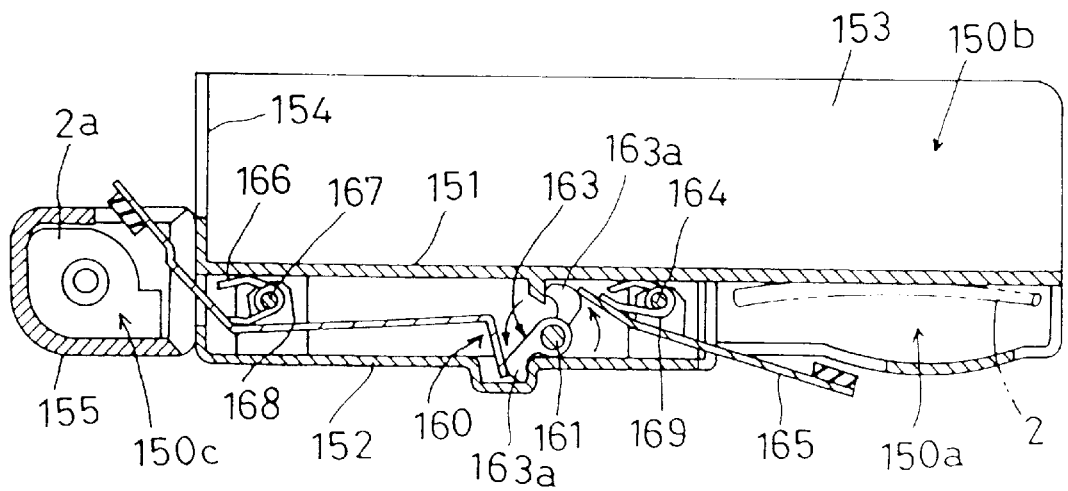
FIG. 14 is a sectional view of the pressing/retaining mechanism of the tray.

The construction of the carrier 150 of tray 100 will be described with reference to FIG. 12. The carrier 150 is in the form of a box having, as main components thereof, a top plate 151, a bottom plate 152, a first side plate 153 and a second side plate 154. The print holder 150b is formed on the top plate 151. To retain the prints 3 as stacked on the top plate 151, the first side plate 153 and second side plate 154 project from the top plate 151 to enclose the prints 3 from two directions. The print holder 150b is open in the remaining two directions to facilitate loading and unloading of the prints 3. The film holder 150a is in the form of a pocket between the top plate 151 and bottom plate 152 for storing negative films 2, i.e. bare piece negatives or piece negatives inserted into negative sheets. In addition, a cartridge holder 150c is provided in the form of a box 155 attached to an outer surface of the second side plate 154 and opposed to the film holder 150a, for storing a cartridge 2a containing a roll of negative film 2 designed for an advanced photo system.

Figure 15:
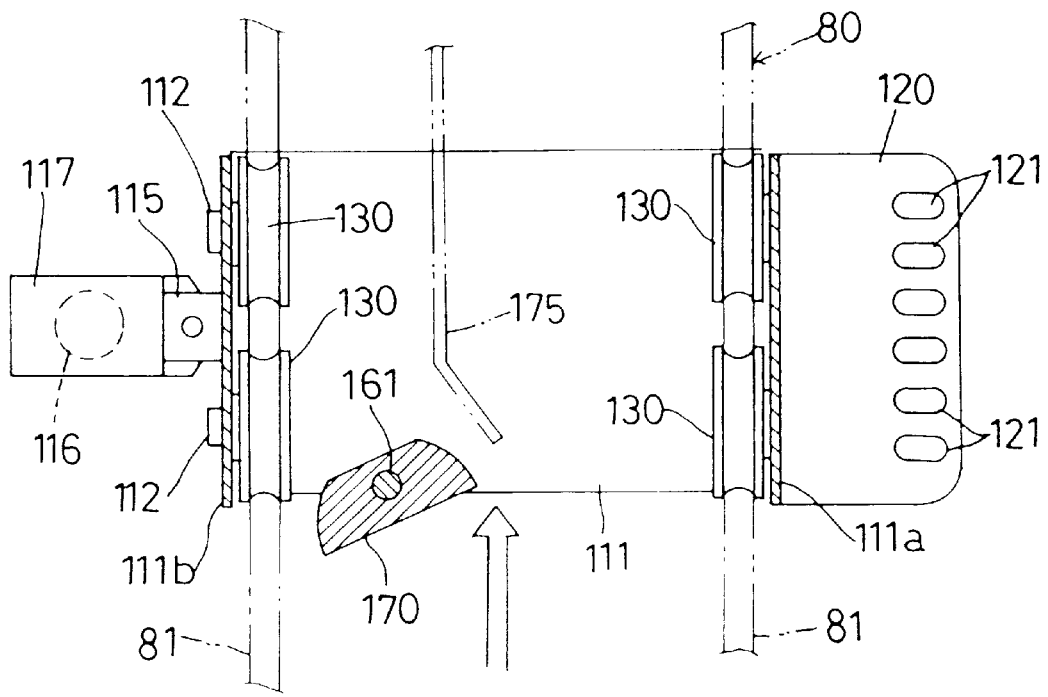
FIGS. 15(A) and 15(B) are explanatory views showing operation of a control knob.
Figure 15:
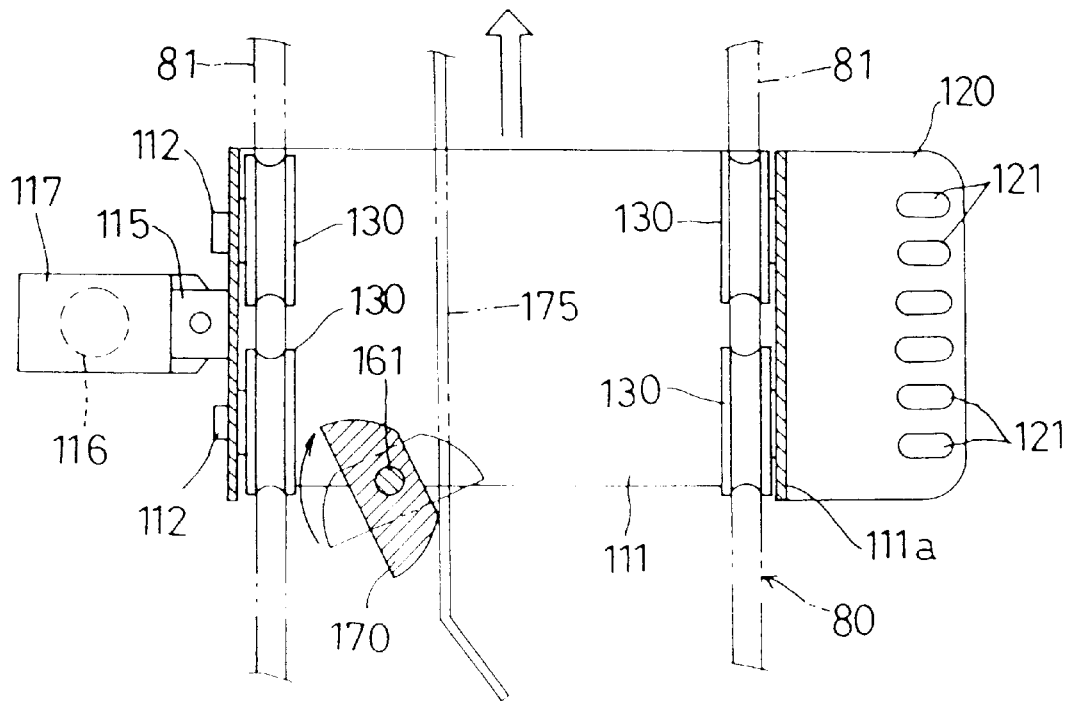

As seen from FIG. 5, the trays 100 are suspended upside down during their movement from the negative film intake station 71 to the standby station 72. To prevent the articles falling from the film holder 150a and cartridge holder 150c, the tray 100 includes a pressing/retaining mechanism 160. As illustrated in FIGS. 12 through 15, the pressing/retaining mechanism 160 includes a shaft 161 rotatably supported by the bottom plate 152 through a plurality of bearing brackets 162, a lug sleeve 163 fixed to the rotatable shaft 161, a first presser plate 165 pivotable in seesaw motion about a shaft 164 fixed to the top plate 151 to press one end thereof upon the negative films stored in the film holder 150a, and a second presser plate 168 pivotable in seesaw motion about a shaft 167 fixed to the top plate 151 to press one end thereof upon the cartridge stored in the cartridge holder 150c. The first presser plate 165 and second presser plate 168 are pivotable in opening directions by a turning force of the lug sleeve 163 transmitted through contact with lugs 163a on the lug sleeve 163. The presser plates 165 and 168 are pivotable in pressing directions under spring load, and for this purpose helical springs 166 and 169 are provided therefor, respectively. For turning the rotatable shaft 161, a rounded control knob 170 is fixed to the end of the shaft 161 opposed to the running base 111. As shown in FIG. 15, the control knob 170 is operable through contact with a knob guide rail 175, to turn the rotatable shaft 161. As a result, the lug sleeve 163 is displaced from the position shown in FIG. 13 to the position shown in FIG. 14. The lugs 163a thereby push up the first and second presser plates 165 and 168 against the forces of the helical springs 166 and 169, to open the first and second presser plates 165 to allow negative films 2 to be loaded into the film holder 150a and the cartridge 2a into the cartridge holder 150c. Upon termination of the contact between the knob guide rail 175 and control knob 170, the first and second presser plates 165 and 168 assume positions to press the articles stored. Therefore, the knob guide rail 175 is disposed in a region of the tray 100 where the negative films 2 are moved in and out.

As seen from FIG. 4, the controller 5 performs various functions besides the functions described hereinbefore. Based on results of detection by an image sensor 14 with respect to the negative films 2 drawn from the negative reel 11, a frame image determining unit 5e determines whether the negative films 2 have a trouble such as back exposure, total fogging, total blanking or half size. A negative film ID code allocating unit 5f allocates negative film ID codes peculiar to this photographic processing apparatus, to negative films 2 fed into the apparatus. Information relating to each negative film 2 having the negative film ID code is thereafter stored as linked to the negative film ID code by a link manager 5k. Thus, various information relating to a particular negative film 2 may be retrieved when necessary. Generally, each negative ID code generated by the negative film ID code allocating unit 5f is linked also to a film ID (hereafter referred to as FID) read by the bar-code reader 12 from a bar code seal applied to the negative films 2 in one unit. The negative ID codes are in the form of consecutive numbers easily recognizable by the operator. Each negative film ID code is used, in place of the FID, in the processes in the photographic processing apparatus 1 to identify negative films 2 in one unit.

Negative films brought by a customer to a processing agent are placed in a product packet 7 having its own packet ID code. The packet ID code is inputted to the controller through a packet ID code input device 7a such as a reader or a keyboard, whereby the link manager 5k links the packet ID code to each FID. As a result, the packet ID code is linked to a negative film ID code. Thus, negative films 2 with a particular FID are put in into a predetermined product packet 7. To assure that the prints 3 produced from these negative films 2 be put into the predetermined product packet 7, a print ID code allocating unit 5g is provided to allocate a print ID code to the area of printing paper 3 printed with frame images of the negative films 2 in the exposing section 20. This print ID code also is linked to the negative film ID code. The print ID code may be formed as a 6-bit code on the printing paper directly and mechanically by a notcher not shown.

Figure 16:
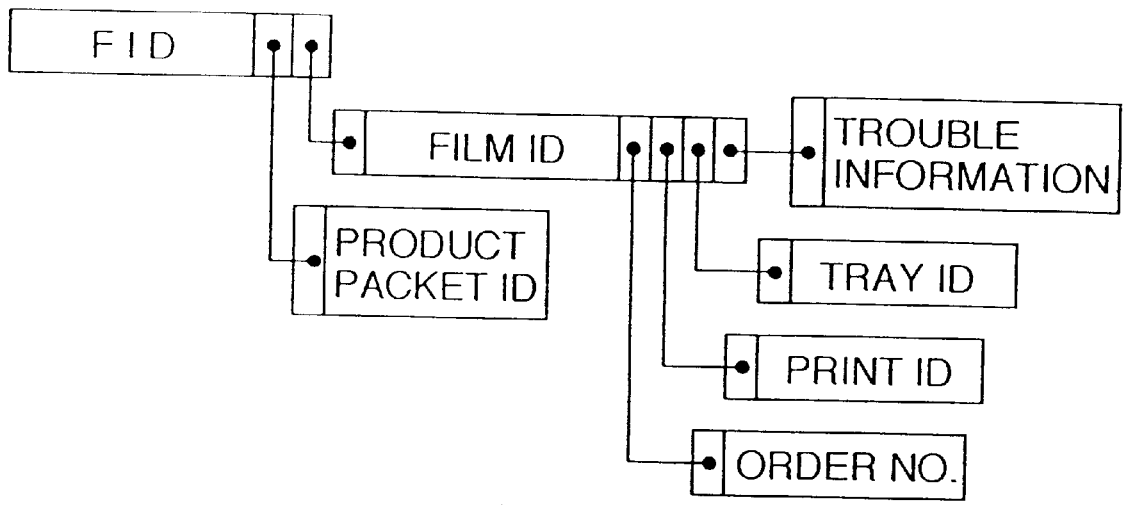
FIG. 16 is a schematic view illustrating a structure for linking varied ID codes.

The link manager 5k links varied events occurring to negative films 2 and prints 3 in the course of photographic processing, as event information to corresponding negative film ID codes and print ID codes. For example, a trouble detecting unit 5i generates trouble information upon detection of a trouble determined by the frame image determining unit 5e, and a collation error or disagreement due to transport jamming detected by the negative film transport control unit 5b which entails a forced discharge of the negative films 2. The link manager 5k links such trouble information as a type of event information to the negative film ID code and print ID code of the negative films 2 responsible for the collation error or disagreement, and stores the information in a retrievable state. To facilitate understanding of a link structure of the above various ID codes and trouble information, the link structure is schematically shown in FIG. 16. The negative film ID code has also an orders number linked thereto. The trouble information is also linked as event information to the negative film ID code. Event information may include, besides trouble information, printing data, exposure data and print sizes. Event information relating to the prints 3 may be linked directly to the print ID code, or through the negative ID code. In the former case, the print ID code has pointers for the negative ID and trouble information.

The negative films 2 and prints 3 with a linked negative film ID code and print ID code are loaded into one tray 100 to be combined and collated automatically. The link manager 5k may advantageously link a tray ID code to the negative film ID code, and hence to the print ID code. For this purpose, a tray ID code allocating unit 5h generates and allocates the tray ID code to a corresponding tray 100 based on a signal received from an ID sensor 77 disposed in a predetermined position of the guide circuit 80 for reading perforations 121 in an ID plate 120 attached to the running base 111 of each tray 100 and indicating the tray ID code. Then, the link manager 5k links the tray ID code to the negative film ID code of the negative films 2 to be loaded into the tray 100. The tray ID code is based on presence or absence of perforations 121 formed in six positions, and is therefore generated as a 6-bit code.

Figure 17:
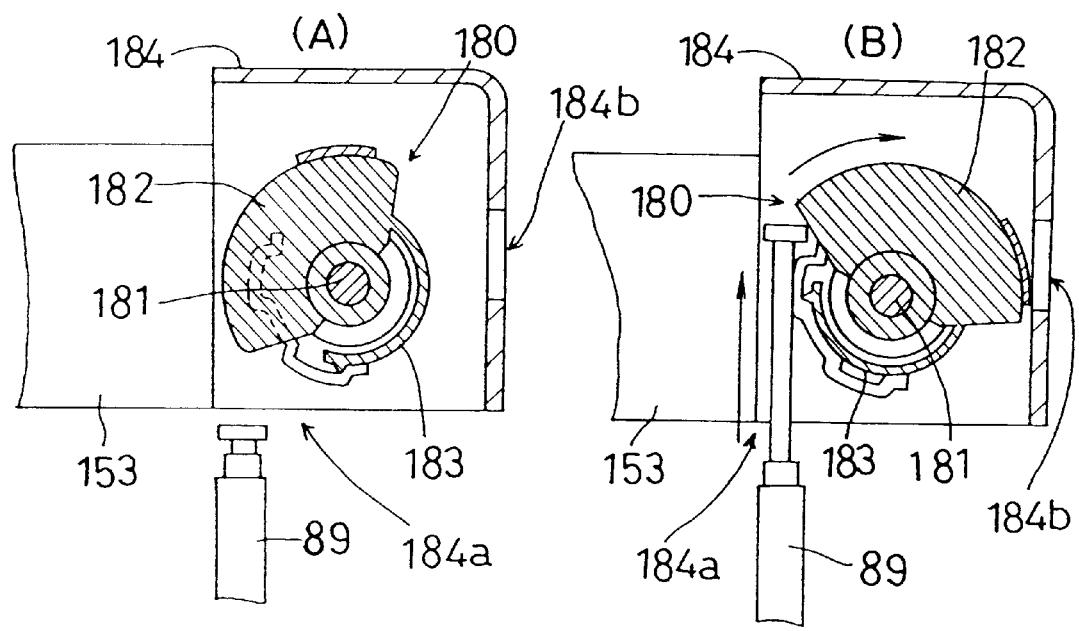
FIG. 17 is a schematic view of a collating mark display.

The tray 100 has a collating mark display 180 attached to the first side plate 153 next to a bracket 114. This collating mark display 180 is used as an alarm device for notifying a disagreement between the negative films 2 and prints 3 to be loaded into the tray 100. As shown in FIG. 17, the collating mark display 180 includes a drum 182 rotatable about an axis 181, an elastic element 183 elastically supporting the drum 182, and a housing 184 accommodating the drum 182. The housing 184 defines an opening 184a for receiving an external force to move the drum 182, and a display bore 184b. The drum 182 has a part of a peripheral wall thereof painted red. When the drum 182 rotates to a first position, the red is seen through the display bore 184b. When the drum 182 rotates to a second position, a ground color, e.g. white, is seen through the display bore 184b. The negative films 2 and prints 3 in one unit to be placed on the same tray 100 may not be in agreement owing to some trouble occurring during the processing of the negative films 2 and printing paper 3 in the photographic processing apparatus 1. Then, trouble information is linked to the ID codes of these negative films 2 and prints 3. When the tray 100 stands still at the print intake station 73, a collating mark control unit 5j of the controller 5 causes a mark displaying solenoid 89 disposed at the print intake station 73 to rotate the drum 182 from the second position to the first position. This action notifies the operator that the negative films 2 and prints 3 on this tray are in disagreement. The drum 182 in the first position is returned to the second position at the collating station 74.

Figure 18:
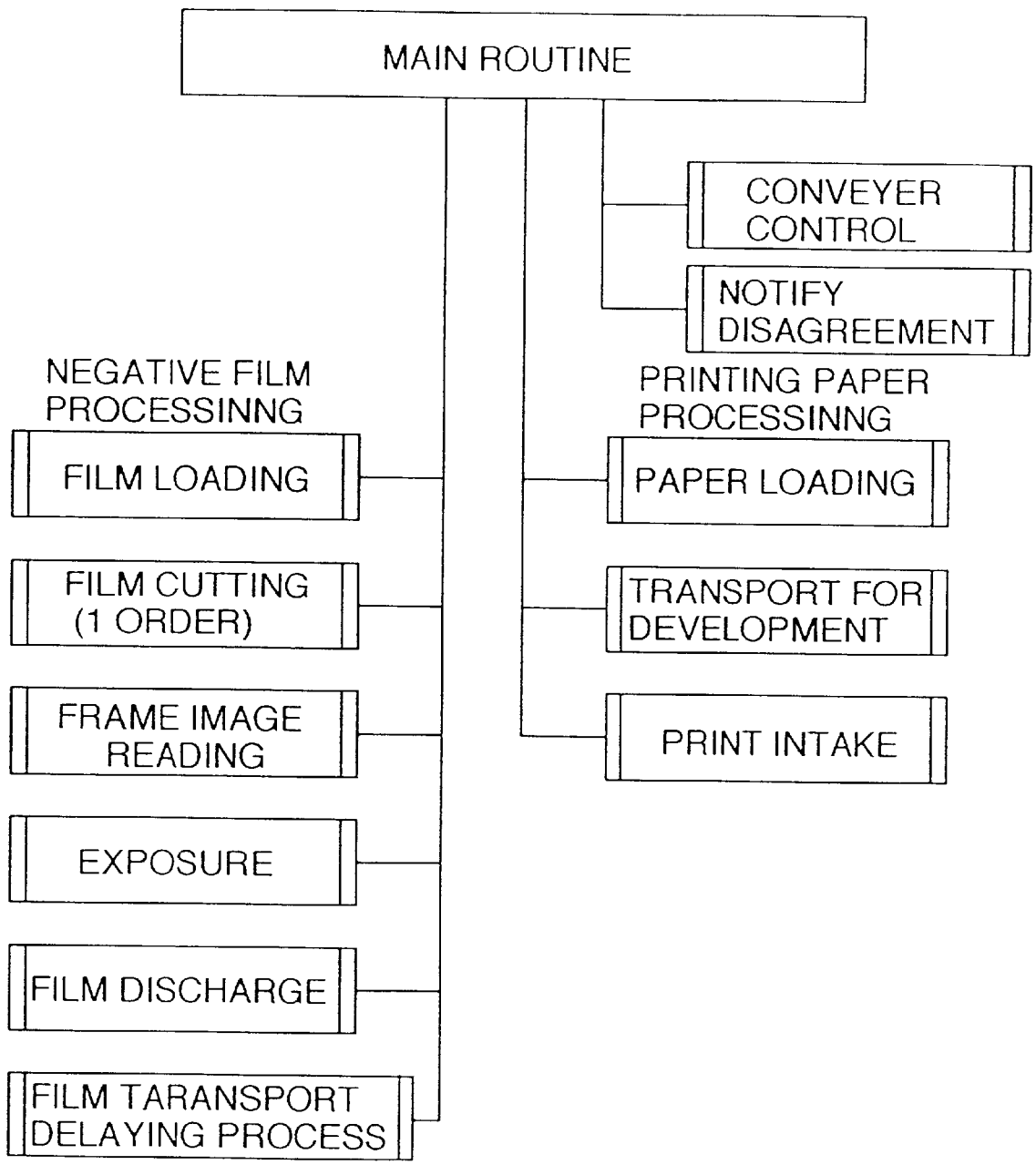
FIG. 18 is an explanatory view of functions of the controller.

Controls relating to the collation between negative films 2 and printing paper or prints 3 in the above photographic processing apparatus 1 will be described next. FIG. 4 shows, in block diagram, the controller 5 which controls the entire photographic processing apparatus 1. FIG. 18 shows the entire operation of the controller 5 in the form of a photograph processing apparatus controlling main routine. The photograph processing apparatus controlling main routine calls various processing routines to execute necessary processes. FIG. 18 shows, among such various processing routines, the routines relating to the collation in particular. In any case, the controller 5 is based on a microcomputer whose functions basically are provided in the form of programs, and may be illustrated in the two different forms consisting of the block diagram and processing routine flow chart.

Figure 19:
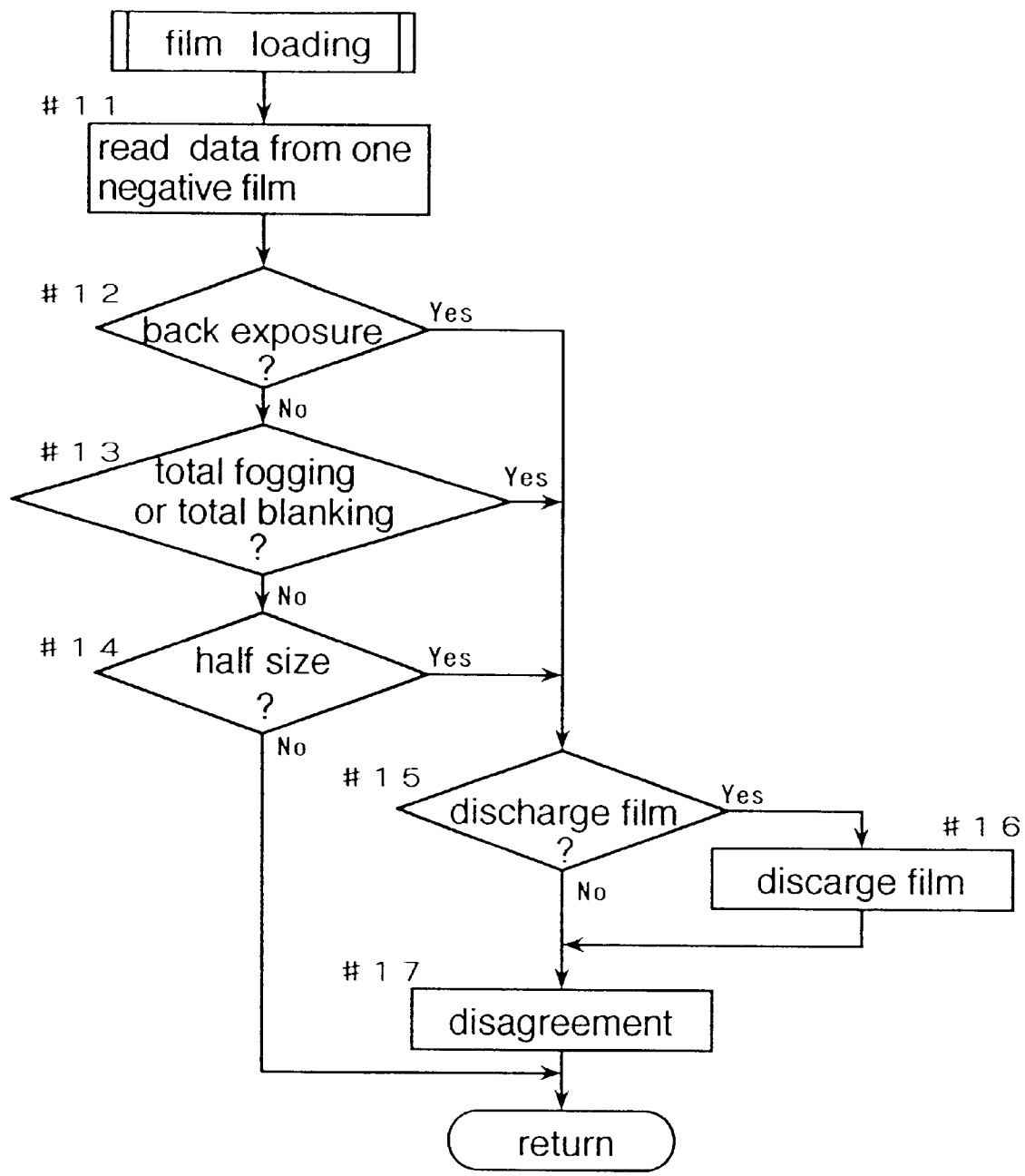
FIG. 19 is a flowchart of a negative loading process.

First, when the negative reel or reels 11 is/are set, a film loading routine is started. In the film loading processing routine, as shown in FIG. 19, the optical sensor reads data of one length (usually corresponding to one order) of negative film 2 (#11). It is determined whether a normal printing process is possible or not. That is, checking is made whether the frame images on this negative film 2 show back exposure (#12), total fogging or total blanking (#13) or whether they are half size instead of being full size (#14). In the case of "yes", a selection is made as to whether the negative film 2 inappropriate to such a printing process should be discharged forcibly, or should be forwarded to the negative film outlet 60 to be transferred to a tray 100 (#15). When the former is selected, this negative film 2 is discharged to a discharge negative box through a midway discharge line, not shown, based on a forcible discharge routine (#16). In any case, when the frame images are inappropriate to the printing process, it is determined to be a trouble of disagreement and trouble information is linked to the ID code of this negative film 2 (#17).

Then, a film cutting routine is executed to cut the negative film 2 after the film loading to a unit length corresponding to one order. The separated negative film 2 is forwarded to the exposing section 20.

Figure 20:
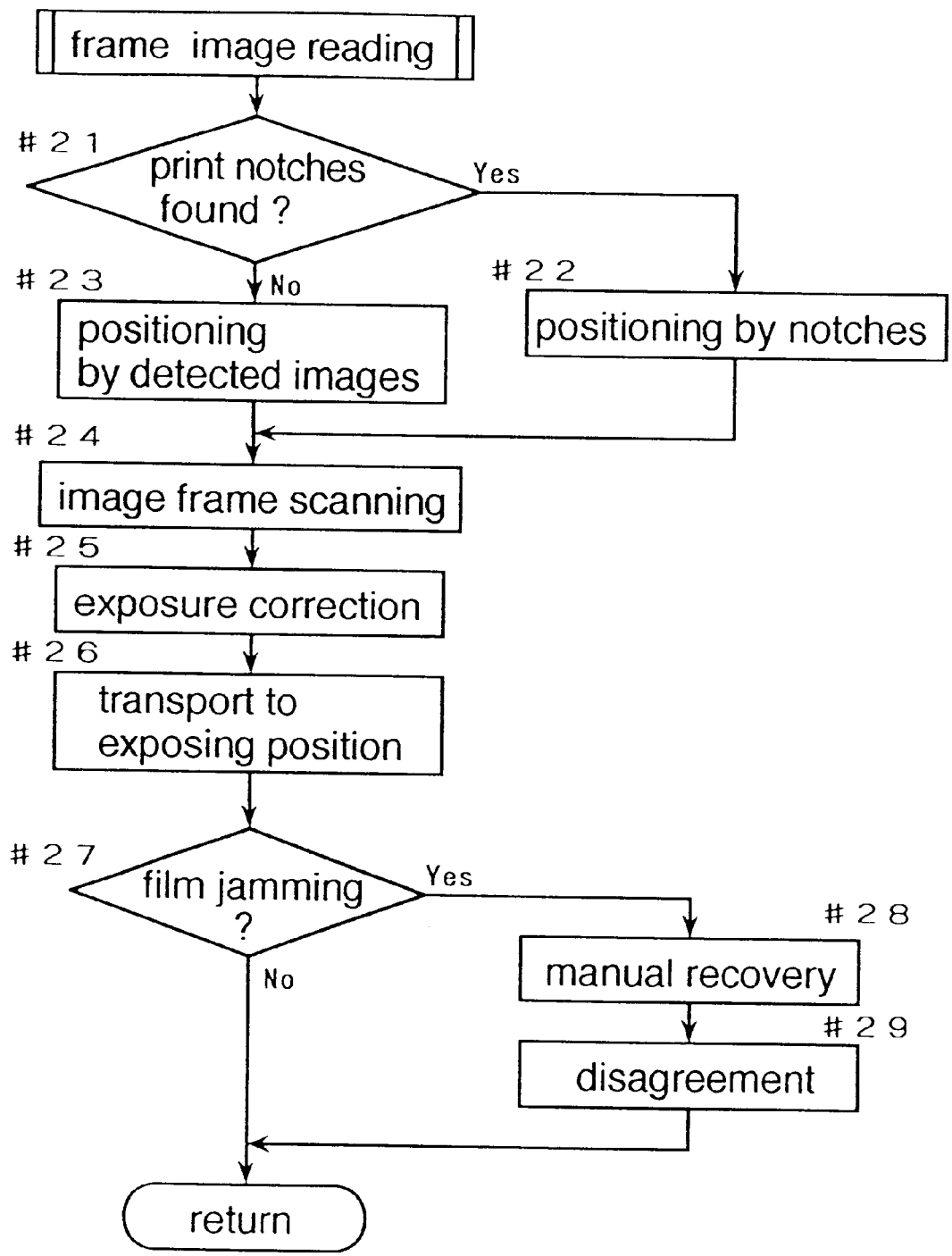
FIG. 20 is a flowchart of a frame image reading process.

The negative film 2 forwarded to the exposing section 20 undergoes a frame image reading routine shown in FIG. 20, which is executed prior to exposure. In the frame image reading routine, it is checked whether the negative film 2 has print notches for use in positioning the frame images (#21). If print notches are found, the frame images are positioned for scanning, by using the print notches (#22). In the absence of print notches, a predetermined frame image is set to scan position while detecting the frame images (#23). The film reader 21 reads image information from the frame images set to position (#24). The image information is stored in an image memory in the controllers 5, and displayed on the monitor 6a after appropriate image processing. An exposure correction is made to the frame images read, as necessary (#25), and the negative film 2 is fed to the exposing position (#26). Checking is made whether a film jam has taken place in the course of this film feeding (#27). In the event of a film jam, the negative film 2 is removed by hand (#28), It is determined to be a trouble of disagreement and trouble information is linked to the ID code of the negative film 2 (#29). The negative film 2 removed is fed to the transport line again after all the negative films rolled on the negative reel 11 are processed.

Figure 21:
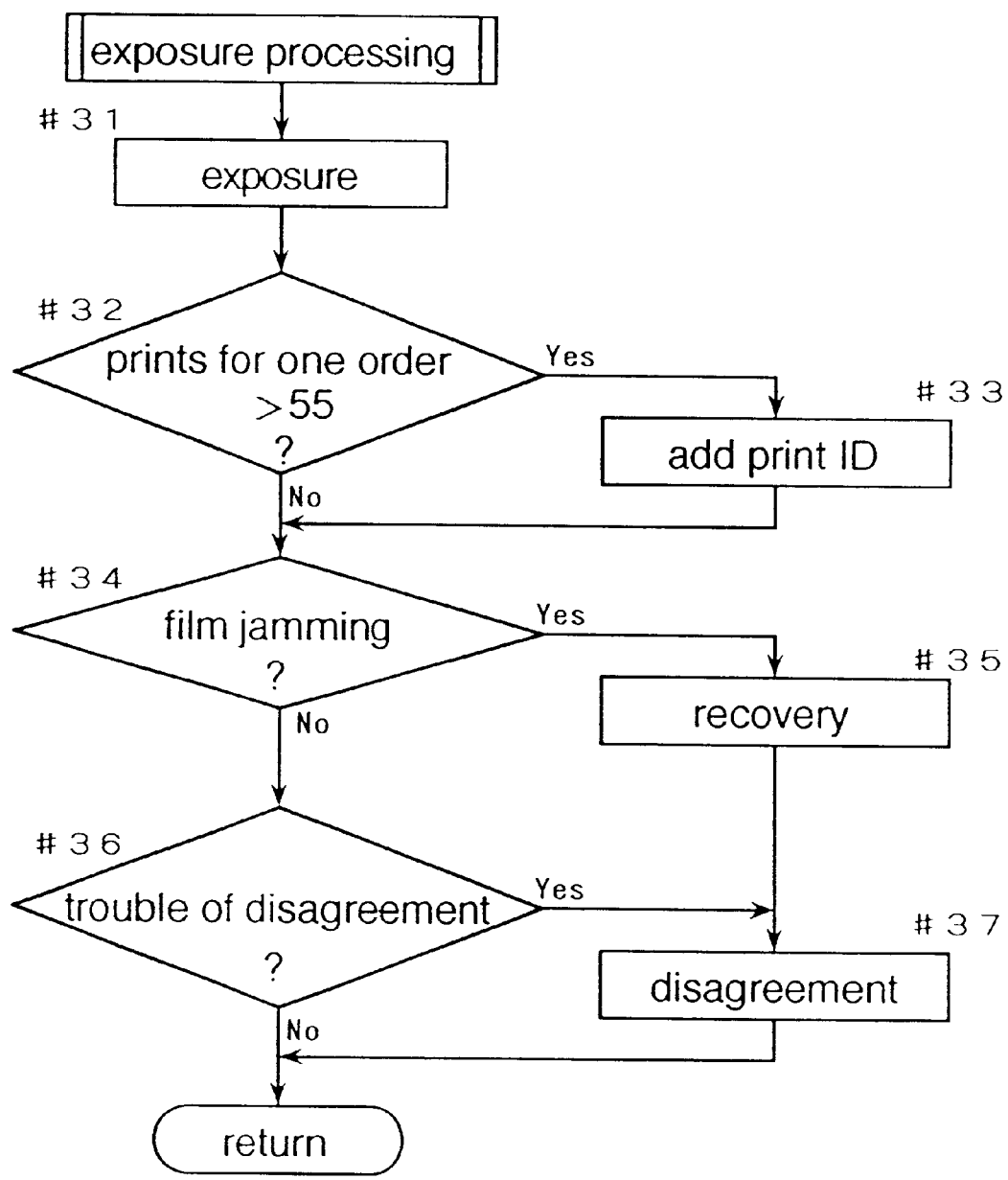
FIG. 21 is a flowchart of an exposing process.

In the exposing process, it is necessary to control the operation of each component of the exposing unit 22 as noted hereinbefore. The exposure processing routine shown in FIG. 21 is limited to movement of the negative film 2. In the exposure processing routine, the frame images of negative film 2 are successively exposed to printing paper 3 (#31). Because of a large number of prints made from each frame image, the number of prints for one order may exceed 55 (#32). Then, the value of print ID is incremented (#33). This print ID usually is affixed to all the prints for one order. By loading negative films 2 and prints 3 in one order into the same tray 100, the order number, negative film ID, print ID and tray ID are linked on one-to-one basis. However, in this embodiment, the number of prints to be placed on one tray 100 is limited to 55. An additional print ID is allocated to any prints 3 beyond 55. That is, two (or more as the case may be) prints IDs are given to one order. As a result, the one-to-one relationship is maintained for the print ID and tray ID. Subsequently, checking is made whether a film jam has taken place in the film feeding in the auto negative mask region (#34). In the event of a film jam, feeding of new negative films 2 to the auto negative mask is stopped once, and a manual recovery operation is carried out to remove the negative film 2 by hand. It is then determined that a trouble of disagreement has occurred, and trouble information is linked to the ID code of this negative film 2 (#35). The negative film 2 removed is fed to the transport line again after all the negative films rolled on the negative reel 11 are processed. When "no" results from step #34, a further checking is made whether a trouble of disagreement has occurred which requires removal of the negative film the photographic processing apparatus (#36). In the event of a trouble of disagreement, trouble information is linked to the ID code of the negative film 2 (#37). Thereafter, an exposing operation is carried out for one order as described hereinbefore.

Figure 22:
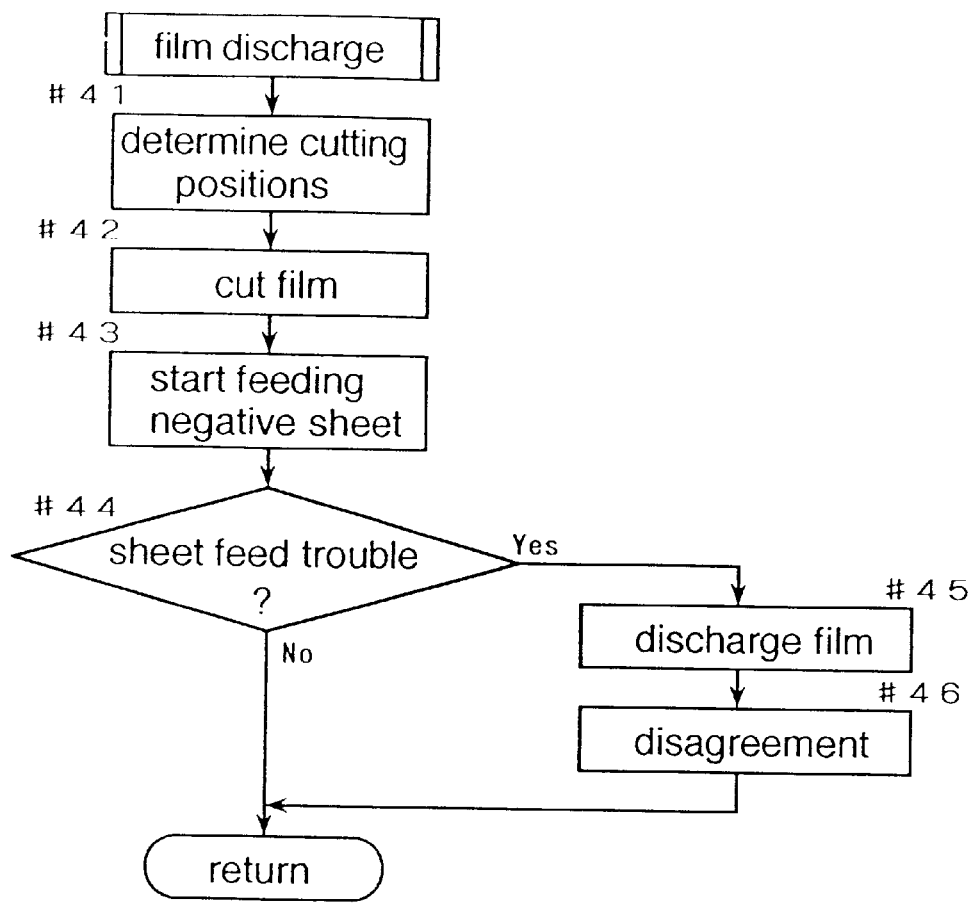
FIG. 22 is a flowchart of a negative discharge process.

The negative film 2 having undergone the exposing process is cut into negative pieces of predetermined length (each having (four or six frames). The cut negative films (negative pieces) are inserted into negative sheet, and discharged from the negative film outlet 60. These processes are carried out according to a film discharge routine. In the film discharge routine shown in FIG. 22, parts of the negative film 2 to be cut are positioned to a cutting line of negative cutter 25 (#41). Then, the negative cutter 25 is operated to produce negative films 2 of predetermined length (#42). The cut negative films 2 are inserted into negative sheet by a negative sheet feeder which is known per se (#43). A trouble may occur in the course of sheet feeding which makes the feeding impossible (#44). This may be due, for example, to the negative sheet being too large or too small to fold, or to seams in the negative sheet obstructing the feeding. Then, the negative films 2 are discharged forcibly (#45), abandoning the attempt to place the negative pieces 2 on tray 100. Thus, trouble information is linked to the ID code of the negative films 2 (#46).

Figure 23:
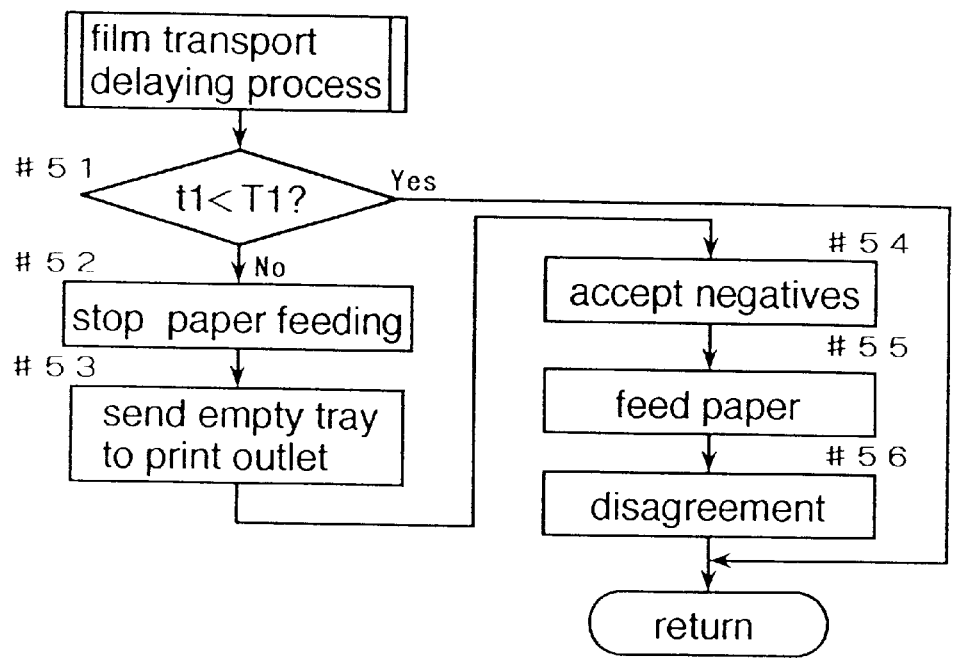
FIG. 23 is a flowchart of a negative transport delaying process.

If an excessively long processing time is taken in the exposing section 20 from completion of exposure of a final frame image to discharge through the negative film outlet 60, the tray 100 loaded with the negative films 2 in negative sheet discharged from the negative film outlet 60 usually fails to arrive at the print intake station 73 by the time the print 3 having the final frame image developed is discharged from the print outlet 50. A film transport delaying routine is provided to cope with such a situation. In the film transport delaying routine shown in FIG. 23, checking is made whether time t1 elapsed from discharge from the developing section 30 of the print 3 having the final frame image on the negative film 2 is less than time limit T1 (#51). If time t1 exceeds time limit T1, the feeding of printing paper 3 to the exposing section 20 is discontinued (#52). To handle the prints 3 discharged from the print outlet 50 for the present, an empty tray 100 is sent off to the print outlet 50 (#53). Then, the negative films 2 from the negative film outlet 60 are loaded into a next tray 100 (#54), and the feeding of printing paper 3 is resumed (#55). At the same time, the negative films 2 present between the exposing section 20 and negative film outlet 60 are regarded as out of disagreement, and trouble information is linked to the ID code of these negative films 2 (#56). The negative film 2 set to the exposing section 20 is regarded as being in order.

Figure 24:
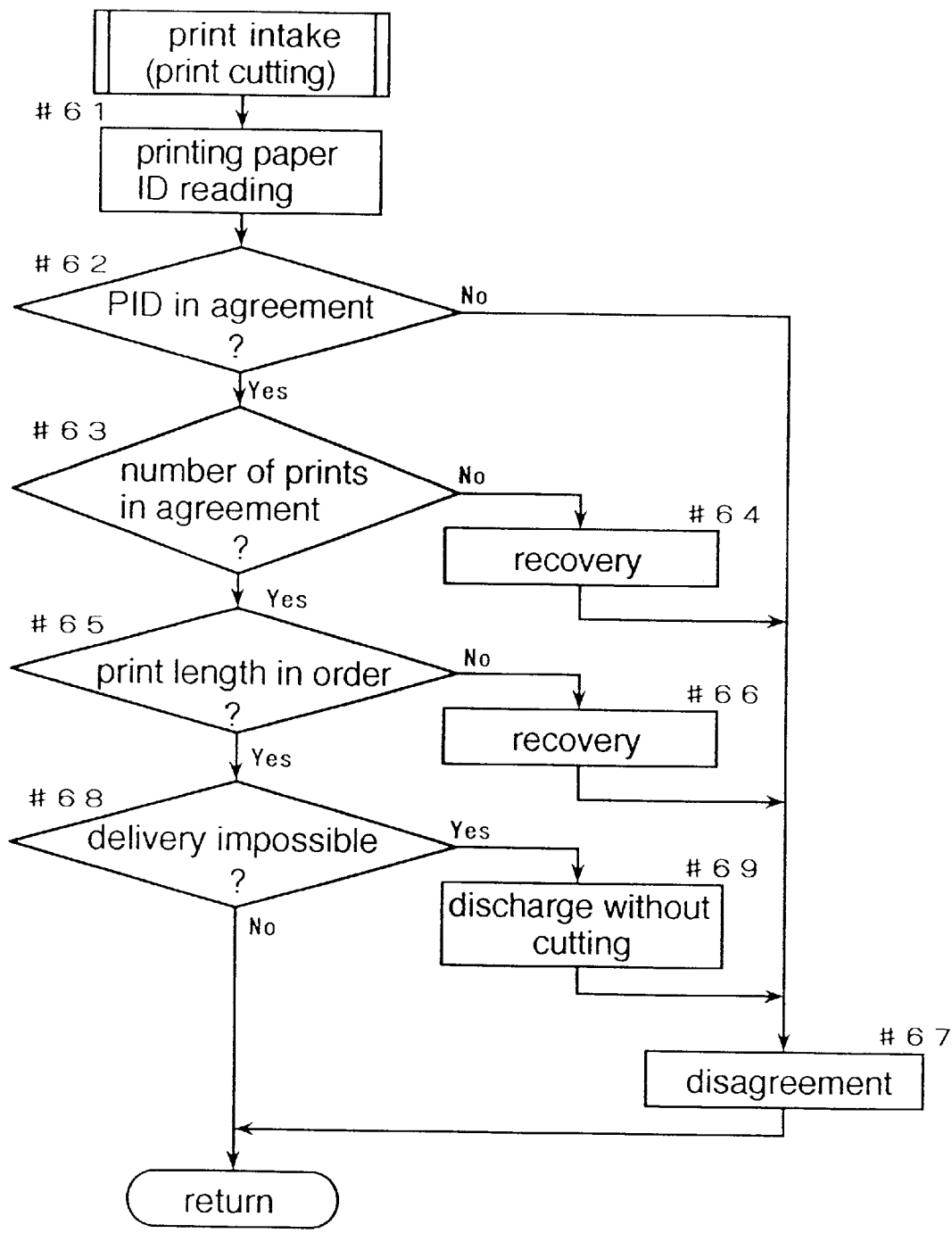
FIG. 24 is a flowchart of a print intake process.

The troubles of collating disagreement occurring in the processing related to the negative film 2 has been described hereinbefore. Such troubles of collating disagreement may take place also in the processing of printing paper 3 (and prints after cutting). However, no trouble of disagreement occurs up to the drying stage in the section since printing paper 3 is continuously processed after being fed to the exposing section 20 by the paper loading routine, developed by passing through the respective processing tanks in the developing station 30 by a developing section transport routine. The question arises with the step of loading a predetermined tray 100 with prints 3 cut from the printing paper 3. This processing routine is shown in FIG. 24. Prior to print cutting by the paper cutter 51, a row of notches formed in a side edge of printing paper 3 to represent a 6-bit print ID is read optically (#61). This print ID is checked to see if it agrees with the print ID stored in the form of link structure in the controller 5 (#62). In the event of disagreement, trouble information is linked to this print ID (#67). Further, the number of images exposed is checked against the number of prints cut from printing paper 3 by the paper cutter 51 (#63). As a result of this checking, the number of prints actually cut for this order by the paper cutter 51 may prove larger than the number of images exposed for this order, i.e. the number of prints stored in the controller 5 in time of the exposing process. In a recovery process executed in this case, these prints 3 are loaded into the tray 100 linked to these prints 3 for the present. The number of prints actually cut for this order by the paper cutter 51 may be smaller than the number of prints stored in the controller 5 for this order. In a recovery process executed in this case, a tray ID is added, when the number of prints stored in the controller 5 is reached, to prepare for a tray to be loaded with the remaining prints. In this embodiment, the number of prints stored in the controller 5 can be calculated by using the order notches dividing the printing paper 3 into units of orders. The frame images formed between the order notches correspond to the number of prints. Therefore, the above trouble is caused by an oversight in the (no order notch being detected even when a designated number of prints is reached) detection of the order notches or an excessive detection of the order notches (an order notch or notches are detected though a designated number of prints has been reached) in the region of paper cutter 51. In any case, if the number of prints is in disagreement, the recovery process relating to allocation of a tray 100 to be loaded is executed (#64). Subsequently, trouble information is linked to this print ID (#67). Further, a print length is checked here (#65). When a predetermined length is exceeded, a recovery is executed to cut Subsequently, trouble information is linked to this print ID prints 3 to a length for loading into the tray 100 (#67). If a trouble occurs with the transport system or the like to make it to deliver prints 3 to the print intake station 73 (#68), the printing paper 3 is discharged through the bypass 54 without being cut (#69). Trouble information is linked to this print ID (#67). In this case, prints 3 are not loaded into a tray 100. The pertinent tray 100 loaded only with negative films 2 is forwarded to the collating station 74.

Trouble information may be linked to the ID codes of negative films 2 carried and prints 3 to be carried by a tray 100 having stopped at the print intake station 73. Thus, the trouble information is linked also to the ID code of this tray 100. Then, a disagreement notifying routine is executed to operate the mark displaying solenoid 89 to display the red mark. This notifies the operator that the negative films 2 and prints 3 for this tray are a mismatch.

Next, an operation of the conveyer mechanism 70 to transport the trays 100 based on a conveyer mechanism control routine will be described.

In the negative film intake station 71, negative films 2 inserted in negative sheet folded, bare negative films 2, or negative films 2 in cartridges for advanced photo systems, delivered from the negative outlet 60 are automatically deposited unit by unit by a feeder not shown, in the film holders 150a of trays 100 stopped by the first stopper 85. The trays 100 released by the first stopper 85 in the negative film intake station 71 descend by gravity, and then run along an upward slope in engagement with the hitches 95 of the third drive unit 90c. The trays 100 are passed on to the first drive unit 90a forming the standby station 72, and are successively stored.

The leading tray 100 stored at the standby station 72 is engaged by a hitch 95 of the chain 91 of the fourth drive unit 90d in intermittent operation, to move up the steep slope in stages corresponding to the intervals between the hitches 95. The fourth drive unit 90d transports the trays 100 in stages corresponding to the intervals between the hitches 95 in interlocked relationship to the release of trays 100 by the second stopper 86 at the print intake station 73. Thus, when each tray 100 stopping at the print intake station 73 receives prints 3 in one unit from the transverse conveyer 53 and is moved down the slope by the fifth drive unit 90e, the next tray 100 is forwarded to the print intake position and stopped by the second stopper 86.

As long as this photographic processing apparatus 1 operates normally, and unless the number of prints in one order exceeds a predetermined amount, negative films 2 are deposited in the trays 100 unit by unit in the order of exposure in the exposing section 20. no tray 100 empty of negative films 2 receives prints 3. By receiving prints from the transverse conveyer 53 in the order of exposure, the film holder 150a of each tray 100 stores the prints 3 of the images of negative films 2 stored in the print holder 150b. When the number of prints in an order exceeds a predetermined amount, a further tray 100 is allocated to the excess prints. Apart from such exceptional cases, some trouble may result in a loss of certain of the negative films 2 and prints 3 stored in a tray 100 having a predetermined ID. This is recognized by the controller 5 as a disagreement. Then, the mark displaying solenoid 88 disposed at the print intake station 73 operates to rotate the drum 182 of collating mark display 180 to the first position to set the red indicative of the disagreement to the display bore 184b. The second stopper 86 releases the trays 100 having received from the transverse conveyer 53 the prints 3 to be combined with the negative films 2 in one unit. The tray 100 descends a little by gravity into engagement with a hitch 95 of the fifth drive unit 90e, and moves downward with movement of the chain 91. The fifth drive unit 90e is switchable between intermittent drive for transporting each tray 100 in stages corresponding to the intervals between the hitches 95 in interlocked relationship to the operation of the second stopper 86 according, for example, to the number of trays 100 stored at the collating station 74, and normal drive for transporting the trays 100 regardless of a state of the second stopper 86. The trays 100 driven downward by the fifth drive unit 90e enter the storage line of collating station 74 to be passed on to the sixth drive unit 90f once.

The trays 100 having entered the storage line of collating station 74 are stopped in order following the tray 100 stopped by the third stopper 87, to wait for the operator to collect negative films 2 and prints 3 from the trays 100 as finished products. The operator undertakes a predetermined recovery operation for a tray 100 displaying the red disagreement mark. In any case, the trays 100 having the negative films 2 and prints 3 removed therefrom by the operator are forwarded to the fourth stopper 88. This is done by the third stopper 87 operating in interlocked relationship to the second drive unit 90b transporting the trays 100 from the fourth stopper 88 to negative film intake station 71. In response to this operation, the first drive unit 90a advances the trays 100 one by one on the storage line.

The second drive device 90b transports each tray 100 released by the fourth stopper 88 to the negative film intake station 71 upon completion of loading of negative films 2 into the film holder 150a of tray 100 maintained in the stop position by the first stopper 85. That is, when the first stopper 85 releases the tray 100 loaded with negative films 2, the fourth stopper 88 releases the next tray 100 provided that the completion of removal of negative films 2 and prints 3 is detected by the optical sensor 76 disposed in the area of the fourth stopper 88. The empty tray 100 is fed to the negative film intake station 71. In response thereto, the third stopper 87 also releases a tray 100, whereby the tray 100 is forwarded to the fourth stopper 88.

In the foregoing embodiment, the event information is linked to both the negative film ID code and print ID code. It is of course possible within the scope of this invention to link only the negative film ID code and event information, or only the print ID code and event information.

What is claimed is:

1. A photographic processing apparatus comprising:
    an exposing section for printing, on printing paper, images of negative films received from a negative film feeder;
    a negative film outlet for discharging said negative films used in said exposing section;
    a developing section for developing said printing paper printed;
    a print outlet for discharging said developed printing paper as prints by cutting said developed printing paper to a predetermined length;
    a tray conveyor for receiving said negative films in one unit discharged from said negative film outlet, receiving from said print outlet said prints having images obtained from said negative films in said one unit, and combining and transporting said negative films and said prints as finished products;
    negative film ID allocating means for generating a negative film ID code and allocating said negative film ID code to said negative film ID to be subject to a printing process;
    print ID allocating means for allocating a print ID code to said printing paper having frame images of said negative films printed thereon in said exposing section;
    tray ID allocating means for allocating a tray ID code to each tray of said tray conveyor; and
    a link manager for managing a linked relationship among said negative film ID code, said print ID code and said tray ID code;
    wherein said link manager is operable to manage said linked relationship among said negative film ID code, said print ID code and said tray ID code in order to identify said negative films and said prints loaded into a predetermined one of trays.

2. A photographic processing apparatus as defined in claim 1, wherein said link manager is operable to manage a linked relationship between said negative film ID code and a film ID intrinsic to said negative films.

3. A photographic processing apparatus as defined in claim 1, wherein said link manager is operable to manage a linked relationship between said negative film ID code and a packet ID code applied to a product packet in which said negative films have been stored.

4. A photographic processing apparatus as defined in claim 1, wherein said link manager is operable to manage a linked relationship between said negative film ID code and an event occurring with said negative films during photographic processing.

5. A photographic processing apparatus as defined in claim 4, further comprising trouble detecting means for detecting a trouble occurring with said negative films during photographic processing, wherein said link manager is operable to link trouble information recognized by said trouble detecting means to said negative film ID code as said event.

6. A photographic processing apparatus as defined in claim 1, wherein said link manager is operable to manage a linked relationship between said print ID code and an event occurring with said prints during the photographic processing.

7. The photographic processing apparatus of claim 6, further comprising trouble detecting means for detecting a trouble occurring with said printing paper during the photographic processing, wherein said link manager is operable to link trouble information recognized by said trouble detecting means to said print ID code as said event.

8. A photographic processing apparatus comprising:
    an exposing section for printing, on printing paper, images of negative films received from a negative film feeder;
    a negative film outlet for discharging said negative films used in said exposing section;

a developing section for developing said printing paper printed;

a print outlet for discharging said developed printing paper as prints by cutting said developed printing paper to a predetermined length;

negative film ID allocating means for generating a negative film ID code and allocating said negative film ID code to said negative film ID to be subject to a printing process;

print ID allocating means for allocating a print ID code to said printing paper having frame images of said negative films printed thereon in said exposing section;

trouble detecting means for detecting a trouble occurring with said negative film and said print paper; and a link manager for managing a linked relationship between said negative film ID code and said print ID code;

wherein said link manager is operable to link trouble information recognized by said trouble detecting means to said negative film ID code and/or said print ID code.

9. A photographic processing apparatus comprising:

an exposure control unit for printing, on printing paper, images of negative films received from a negative film feeder;

a conveyor control unit for discharging said negative films used in said exposure control unit to a negative film outlet;

a paper transport control unit for transporting said developed printing paper through a developing section to a print outlet;

negative film ID allocating means for generating a negative film ID code and allocating said negative film ID code to said negative film ID to be subject to a printing process;

print ID allocating means for allocating a print ID code to said printing paper having frame images of said negative films printed thereon in said exposing section; and a link manager for managing a linked relationship between said negative film ID code and said print ID code;

wherein said link manager is connected to said exposure control unit, said film transport control unit and said printing paper transport control unit, and wherein said link manager is operable to manage said linked relationship between events occurring with said negative films and said negative film ID code, and between events occurring with said prints and said print ID code.

* * * * *